(12) United States Patent
Lucas et al.

(10) Patent No.: US 7,733,595 B2
(45) Date of Patent: Jun. 8, 2010

(54) HARD DISK DRIVE WITH EXTERNAL SENSOR INTERFACE, SYSTEM FOR USE THEREOF AND METHOD

(76) Inventors: Andrew A. Lucas, 385 Iroquois Rd., Lyons, CO (US) 80540; Lance R. Carlson, 7949 E. Sussex Ct., Niwot, CO (US) 80503; Charles Partee, P.O. Box 218, 952 Steamboat Valley Rd., Lyons, CO (US) 80540

( * ) Notice: Subject to any disclaimer, the term of this patent is extended or adjusted under 35 U.S.C. 154(b) by 247 days.

(21) Appl. No.: 11/327,569

(22) Filed: Jan. 6, 2006

(65) Prior Publication Data
US 2007/0159710 A1 Jul. 12, 2007

(51) Int. Cl.
G11B 21/02 (2006.01)
G11B 15/18 (2006.01)
(52) U.S. Cl. ............................. 360/75; 360/71; 360/69
(58) Field of Classification Search .................... None
See application file for complete search history.

(56) References Cited

U.S. PATENT DOCUMENTS

| | | | |
|---|---|---|---|
| 5,005,089 A | 4/1991 | Thanos et al. | |
| 5,227,929 A | 7/1993 | Comerford | |
| RE35,269 E * | 6/1996 | Comerford | 360/75 |
| 6,055,120 A | 4/2000 | Scherle | |
| 6,754,154 B1 | 6/2004 | Takeda | |
| 7,142,385 B2 | 12/2004 | Susumu | |
| 7,474,970 B2 * | 1/2009 | Miyoshi et al. | 702/56 |
| 2002/0034029 A1 * | 3/2002 | Aoyagi et al. | 360/31 |
| 2002/0093753 A1 * | 7/2002 | Atsumi | 360/73.03 |
| 2003/0043496 A1 * | 3/2003 | Kawana et al. | 360/75 |
| 2004/0125490 A1 | 7/2004 | Fujiki | |
| 2004/0252403 A1 * | 12/2004 | Wehrenberg | 360/75 |
| 2004/0264028 A1 | 12/2004 | Ishii | |
| 2005/0073764 A1 * | 4/2005 | Ogawa et al. | 360/60 |
| 2005/0088773 A1 | 4/2005 | Yoshida | |

(Continued)

FOREIGN PATENT DOCUMENTS

EP 1204117 5/2002

(Continued)

OTHER PUBLICATIONS

Kionix Inc.; Using the Kionix KXM52-1050 Tri-Axis Accelerometer for Hard Drive Shock Protection;, Jan. 2004; Kionix Application Notes; Kionix, Inc., 1 page.

(Continued)

Primary Examiner—Andrew L Sniezek
(74) Attorney, Agent, or Firm—Workman Nydegger

(57) ABSTRACT

A hard disk drive, its use and production are described. A read/write disk stores digital data. A spindle motor supports the read/write disk for controlled rotation thereof. A head arrangement moves to selectively access the read/write disk in a data access mode and moves to a parked position. A dedicated input is receives a first sensor related input signal. A processing arrangement executes the data access mode by cooperatively controlling the spindle motor and the head arrangement, monitoring the sensor related input signal for a predetermined characteristic thereof, and responsive to detection of the characteristic, at least moves the head arrangement to the parked position. A hard disk drive multi-sensor group, monitoring technique and interface are described.

39 Claims, 10 Drawing Sheets

U.S. PATENT DOCUMENTS

| | | | |
|---|---|---|---|
| 2005/0141127 A1 | 6/2005 | Shimotono | |
| 2005/0213242 A1 | 9/2005 | Fujiki | |
| 2005/0278557 A1* | 12/2005 | Asoh et al. | 713/300 |
| 2006/0092550 A1* | 5/2006 | Ishii et al. | 360/75 |
| 2006/0152842 A1* | 7/2006 | Pasolini et al. | 360/75 |
| 2006/0215299 A1* | 9/2006 | Kao et al. | 360/69 |
| 2008/0259496 A1* | 10/2008 | Shimotono et al. | 360/137 |

FOREIGN PATENT DOCUMENTS

| | | |
|---|---|---|
| EP | 1564727 | 8/2005 |
| EP | 1612565 | 1/2006 |
| EP | 07716356.6 | 1/2009 |
| EP | 07716356.6 | 7/2009 |
| EP | 07716356.6 | 1/2010 |
| JP | 2536985 | 9/1992 |
| JP | H 16-127364 | 4/2004 |
| JP | H 17-190641 | 7/2005 |
| KR | 10-2008-7019273 | 12/2009 |

OTHER PUBLICATIONS

IBM Corp.; IBM Active Protection System Whitepaper; Oct. 2003;IBM Corp. Whitepaper; IBM Corp.; pp. 1-8.
Galvin et al; Inertial Sensing for Hard Disk Drive Drop Protection; Apr. 2005, Insight—The Online Journal of IDEMA; pp. 1-7.
Kionix, Inc.; Kionix, Inc. Serial Development Board User's Manual; Sep. 13, 2004; Kionix, Inc.; pp. 1-28.
Kionix, Inc.; Kionix, Inc. KXM52 Series Accelerometers and Inclinometers Data Sheet; Jun. 21, 2005; Kionix, Inc.; pp. 1-3.
Kionix, Inc.; Kionix, Inc. KXM60 Series Data Sheet Accelerometers and Inclinometers; Jun. 17, 2005; Kionix, Inc.; pp. 1-3.

* cited by examiner

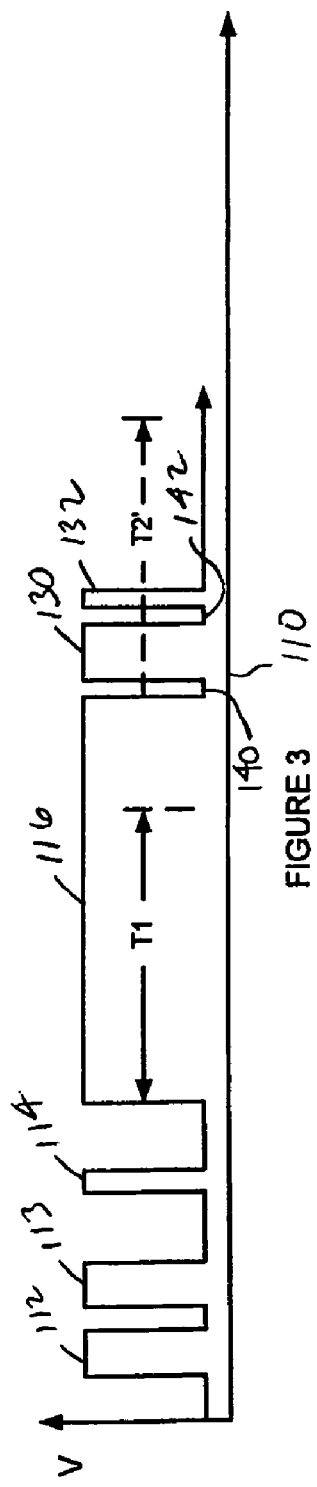
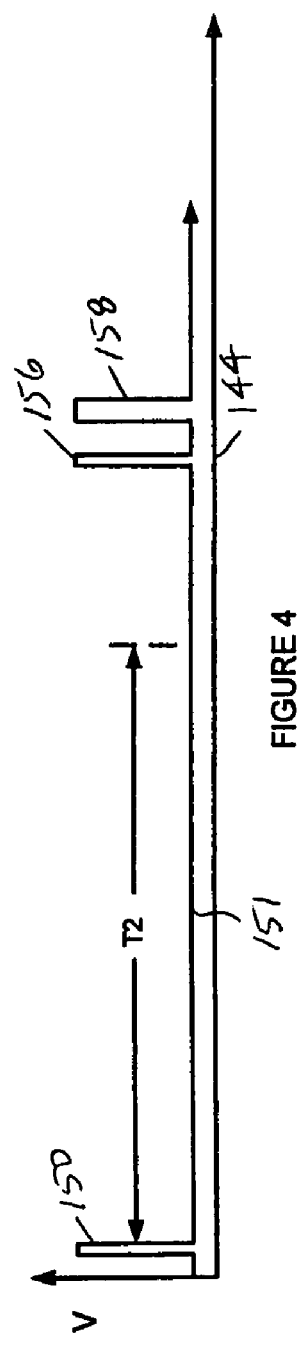
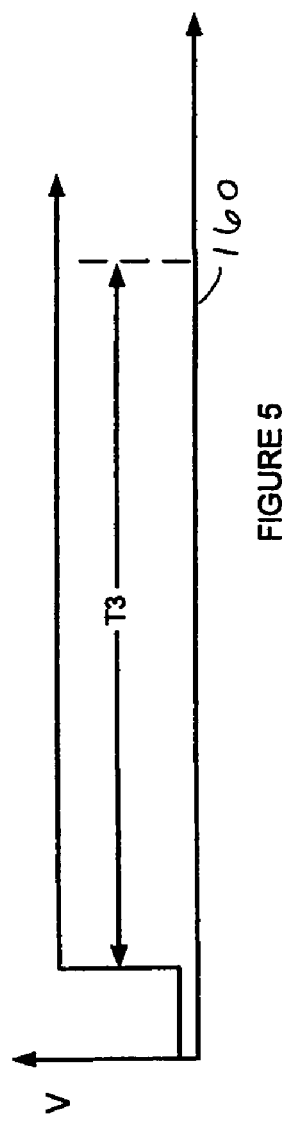
FIGURE 3
FIGURE 4
FIGURE 5

HARD DISK DRIVE WITH EXTERNAL SENSOR INTERFACE, SYSTEM FOR USE THEREOF AND METHOD

BACKGROUND

It is well known that hard disk drives are susceptible to mechanical shock, particularly in a data access mode wherein a head arrangement is accessing a rotatable storage disk. Accordingly, dropping a hard disk drive, while it is engaged in a disk access, often produces a data loss or even a catastrophic failure of the drive. In this regard, a hard disk drive is generally substantially more resistant to mechanical shock when its head arrangement is in a parked position. One prior art approach, in attempting to avoid mechanical shock related failure during disk access, relies on moving the head arrangement to a parked position, if a mechanical shock event is anticipated. A specific example of this approach is presented in U.S. Pat. No. Re. 35,269, issued to Comerford.

The Comerford patent teaches a protective reflex system which utilizes a three axis accelerometer arrangement. Outputs derived from the three accelerometer axes are processed so as to identify a zero or reduced gravity state. The identification of such a state is useful in establishing the fact that the accelerometer arrangement may be falling. Of course, detection of a falling condition is predictive of an impending collision with the ground, such that preventive measures can, at least potentially, be taken prior to impact. In particular, it would be desirable to park the head or heads prior to a collision with the ground in order to avoid a catastrophic drive failure.

Comerford recognizes that the need to park the head arrangement may be urgent. In order to meet the need for urgency, the patent teaches the use of a dedicated processor in conjunction with the additional use of a central processing unit (CPU). The dedicated processor provides exclusive monitoring of the accelerometer arrangement. Responsive to detecting a value in a preset range of accelerations, the dedicated processor generates an interrupt to the CPU and parks the head arrangement. Apparently, the dedicated processor, like the CPU, is programmed for issuing standard commands to the hard disk, via a standard interface, since there is no specific teaching found in the patent with respect to a need for modification of the electrical interface of the hard disk. Unfortunately, it is submitted that a number of problems are associated with the approach taken by Comerford, as will be described in detail at one or more appropriate points below.

More recently, the use of a freefall sensing arrangement has been contemplated by Kionix, Inc. of Ithaca, New York in several papers. One paper is entitled USING THE KIONIX KXM52-1050 TRI-AXIS ACCELEROMETER FOR HARD DRIVE SHOCK PROTECTION, while another paper entitled INERTIAL SENSING FOR HARD DISK DRIVE DROP PROTECTION appeared in the online journal of the International Disk Drive Equipment and Materials Association in the second quarter of 2005. It is of interest that Comerford, at col. 4, lines 6-14 makes a recognition is shared by these papers. In particular, measurement of a freefall sensor output value, continuously over a period of time, suggests that a fall is in progress. The prior art of which Applicant is aware, however, fails to take the use of the freefall sensor output beyond this somewhat simplistic recognition. As will be described in detail below, there are further attributes of a freefall sensor output that are considered to be of interest.

Aside from freefall detection, Comerford and the prior art of which Applicant is aware, fails to recognize or account for certain additional environmental factors that can affect the operation of a hard disk drive in adverse ways. A number of these environmental factors are described in detail below and are considered to be significant with respect to protection of a hard disk drive in an anticipatory manner.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described limitations have been reduced or eliminated, while other embodiments are directed to other improvements.

A hard disk drive and associated method are described. In one aspect of the present disclosure, the hard disk drive includes a read/write disk for storing digital data. A spindle motor supports the read/write disk for controlled rotation thereof. A head arrangement is configured for movement to selectively access the read/write disk in a data access mode and for movement to a parked position. A first dedicated input is dedicated for receiving a first sensor related input signal and a processing arrangement is configured for (i) executing the data access mode by cooperatively controlling the spindle motor and the head arrangement, (ii) monitoring the first sensor related input signal for a first predetermined characteristic thereof, and (iii) responsive to detection of the first predetermined characteristic, at least moving the head arrangement to the parked position.

In another aspect of the present disclosure, a hard disk drive and associated method are described for operation in an environment that may subject the hard disk drive to a given mechanical shock. The hard disk drive arrangement includes a read/write disk for storing digital data. A spindle motor supports the read/write disk for controlled rotation thereof. A head arrangement is configured for movement to access the read/write disk in a data access mode and for movement to a parked position as part of a protected mode such that the hard disk drive arrangement is not susceptible to the given mechanical shock in the protected mode and is susceptible to the given mechanical shock in the data access mode. A dedicated input is dedicated for receiving a sensor related input signal. A processor is provided for (i) executing the data access mode, by cooperatively controlling the spindle motor and the head arrangement, (ii) monitoring the sensor related input signal for a predetermined characteristic thereof and (iii) responsive to detection of the predetermined characteristic of the sensor related input signal, causing the hard disk drive to enter the protected mode at least by moving the head arrangement to the parked position.

In a related aspect of the present disclosure, a sensor group and interface are used such that a plurality of environmental factors can be monitored by a hard disk drive that is housed in a host device.

In still another aspect of the present disclosure, a host device includes a housing that is operable by a user in a way which produces a mechanical shock to which at least a particular component of the host device is sensitive in an operating mode and which is less sensitive to the mechanical shock in a protected mode thereof, and which host device includes a housing switch that actuates in a way that is anticipatory with respect to the mechanical shock. An arrangement and associated method detect an actuation of the housing switch and, thereafter, cause the particular component to enter the protected mode from the operating mode as anticipatory to the mechanical shock.

In yet another aspect of the present disclosure, a system includes a hard drive which itself includes a read/write disk for storing digital data, a spindle motor supporting the read/write disk for controlled rotation thereof, a head arrangement configured for movement to selectively access the read/write disk in a data access mode and for movement to a parked position, a sensor interface dedicated for receiving a plurality of sensor signals, a processing arrangement for executing the data access mode by cooperatively controlling the spindle motor and the head arrangement and for monitoring the sensor signals for detection of a signal value that is indicative of a potentially adverse operational environment for the hard drive and, responsive to detection of the signal value, for at least moving the head arrangement to a parked position. The system further includes a sensor array, which is not part of the hard drive, having at least two sensors to provide the sensor signals to the sensor interface.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be illustrative rather than limiting.

FIG. 3 is a plot of sensor output versus time, shown here to illustrate a number of sensor events in relation to minimum pulse duration T1 that is generally indicative of a falling condition.

FIG. 4 is another plot of sensor output versus time, shown here to illustrate a second time interval in relation to a sensor output that is generally indicative of a return to a stable environment.

FIG. 5 is still another plot of sensor output versus time, shown here to illustrate a third time interval in relation to a sensor output that is generally indicative of a malfunctioning sensor.

FIG. 9 is a flow diagram which illustrates one implementation of sensor code that is well suited for monitoring a sensor such as, for example, a pressure sensor, a temperature sensor and the like.

FIG. 10 is a flow diagram which illustrates one implementation of sensor code that is well suited for monitoring a sensor such as, for example, a housing switch and the like.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiment shown but is to be accorded the widest scope consistent with the principles and features described herein including alternatives, modifications and equivalents, as defined within the scope of the appended claims. It is noted that the drawings are not to scale and are diagrammatic in nature in a way that is thought to best illustrate features of interest. Further, like reference numbers are applied to like components, whenever practical, throughout the present disclosure. Descriptive terminology such as, for example, uppermost/lowermost, right/left, front/rear and the like has been adopted for purposes of enhancing the reader's understanding, with respect to the various views provided in the figures, and is in no way intended as being limiting.

Figure 1:
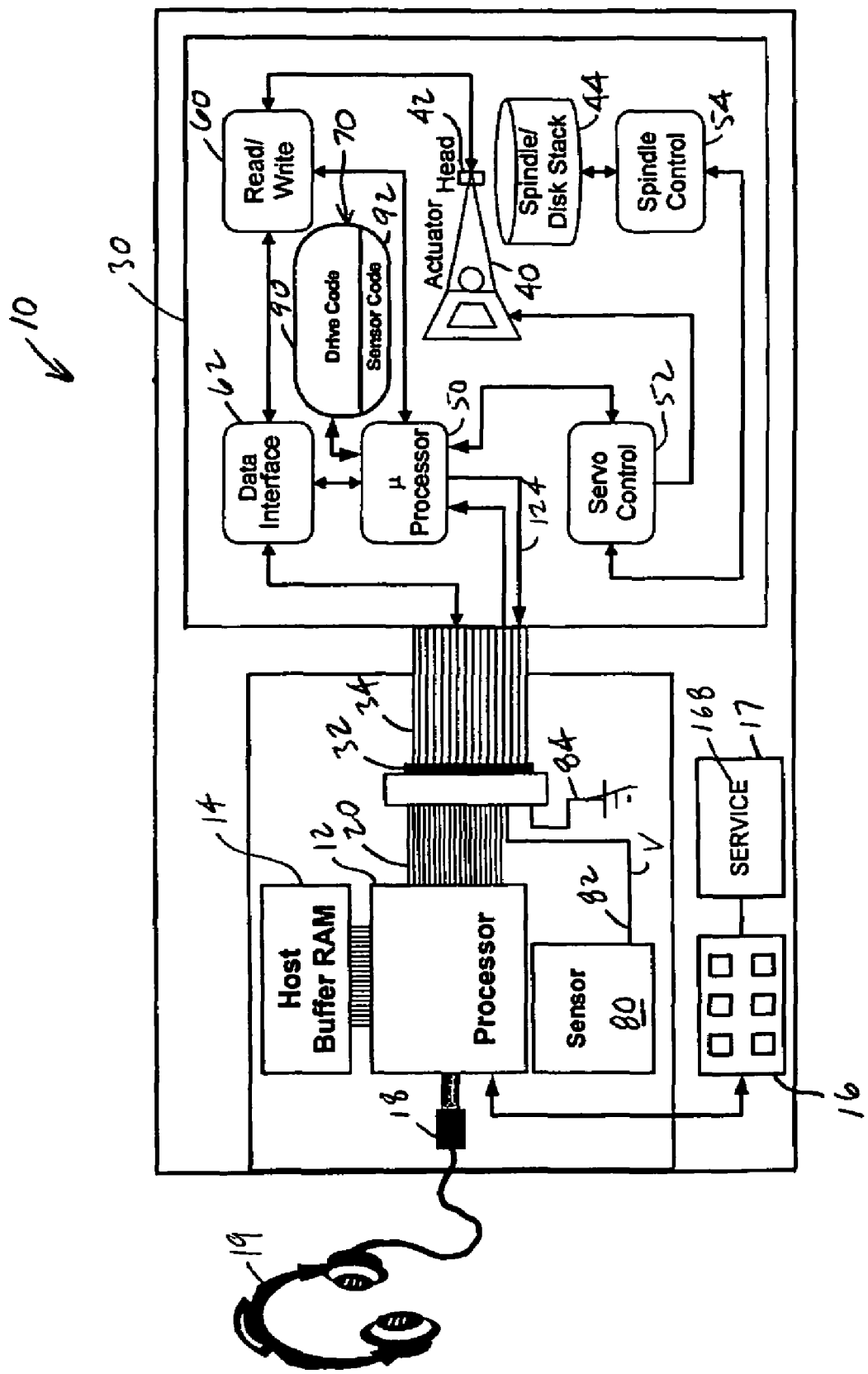
FIG. 1 is a block diagram of a host device and hard drive that is housed in the host device, shown here to is illustrate the use of a dedicated sensor input which forms part of the hard drive.

Turning now to the drawings, wherein like components are indicated by like reference numbers throughout the various figures, attention is immediately directed to FIG. 1, which is a block diagram illustrating one embodiment of an electronic host device, generally indicated by the reference number 10. It is to be understood that device 10 is intended to be representative of any number of digitally implemented device types including, but not limited to wireless telephones, internet appliances, personal digital assistants, music players, multi-function pagers, multimedia devices or any other device adaptable to use with an electro mechanical digital storage device. The concepts taught herein are well suited for use in devices which may, at times, be subjected to use in a "hostile" environment in which the device experiences mechanical shock forces. Portable devices are commonly exposed to such an environment. The use of these concepts, however, is in no way limited to use in portable devices, but finds application in essentially any form of device that may be objected, at least briefly, to mechanical shock.

Continuing with a description of FIG. 1, host device 10 includes a processing arrangement 12 configured for operating the overall device. A host memory section 14 is associated with processing arrangement 10 which may be, for example, a suitable form of RAM. Alternatively, the memory section can be made up of a suitable combination of ROM and RAM wherein a volatile RAM portion of the memory section is loaded for device operation during an initial boot-up.

With continuing reference to FIG. 1, device 10 further comprises a user interface arrangement, for example, in the form of a keypad 16, a display 17 and a headset connector 18 that is connected to an external headset 19. Other item include an interface 20 that may be configured in accordance with a number of well-known interface arrangements such as, for example, compact flash, IDE or any other suitable interface that is currently in use or yet to be developed.

A hard drive 30 is housed within host device 10 and includes a connector arrangement 32 that is electrically connected to interface 20, for example, using a flexible connector, as shown having a connection end 34, or any other suitable connection scheme. Hard drive 30 may be of any suitable configuration based, at least in part on considerations with respect to host device 10. In one implementation, for a portable device, a miniature hard drive such as the CORNICE® Storage Element may be used, although it is to be understood that a hard drive having any suitable form factor may be utilized. Hard drive 30 may be removably received, for example, in a compact flash implementation or mounted as permanent internal storage.

Continuing to refer to FIG. 1, hard disk drive 30 includes a number of functional elements that will be familiar to one having ordinary skill in the art. Among these elements are an actuator 40 configured for selectively moving a head 42 which accesses a disk arrangement 44. The latter may include any suitable number of disks and heads wherein one or both sides of each disk can be used for data storage purposes. Head 42 is configured to cooperate with the rotation of an associated disk, in disk arrangement 44, so as to "fly" above the surface of the disk, in a well-known manner. A microprocessor 50 is used to control a servo section 52 that is itself configured for controlling disk arrangement 44, using a spindle control section 54, and for controlling actuator 40. Disk data is handled under control of microprocessor 50 using a read/write channel 60 in cooperation with a data interface 62. A memory section 70 contains code for use by microprocessor 50 in operating the overall drive, as will be described in further detail hereinafter.

Having generally described host device 10 including hard drive 30, housed therein, additional features of the illustrated arrangement include a sensor 80 that is located in host device 10. A sensor electrical connection 82 is routed through interface 20, from the sensor, to microprocessor 50. In this regard, it is important to understand that sensor electrical connection 82 is dedicated for purposes of carrying a sensor signal from sensor 80 to microprocessor 50 as an input to the microprocessor. A ground reference 84 is illustrated, electrically connected to interface 20, for use as needed. Sensor 80 may also utilize this ground reference, however, this has not been shown in the figure for purposes of illustrative clarity. Although not illustrated, it should be appreciated that it may be appropriate, depending upon the specific characteristics of the output signal generated by sensor 80, to provide signal conditioning at some point along sensor electrical connection 82. Sensor 80 may be of any suitable type relating to protection of hard drive 30 from environmental concerns. These concerns include, but are not limited to mechanical shock, reduction of ambient pressure at higher altitudes and reduction of ambient pressure response to elevated temperature. With respect to mechanical shock, sensors are now available which provide an output signal that is indicative of a reduced gravity state. As described above, such detection of reduced gravity may be predictive of a potential impact, resulting from a fall. Such sensors include the H48C that is available from Hitachi Metals America, Ltd. and the KXM52-1050 from Kionix, Inc.

The H48C generates a digital output signal on a pin that is designated as "ZeroG" such that a positive going output pulse corresponds to a reduced gravity condition and pulse duration corresponds to event duration.

With continuing reference to FIG. 1, operation of hard drive 30 proceeds based on control code that is stored in memory section 70. The latter includes drive code 90, which is used to control the overall functionality of hard drive 30 including coordinating motion of actuator 40 with rotation of disk arrangement 44 by servo section 52, and sensor code 92 for use in monitoring dedicated sensor line 82 and initiating certain responses, yet to be described, based on this monitoring. As will be seen, additional dedicated sensor lines can be provided in the event that two or more sensors are being monitored, to form an overall dedicated sensor interface. Of course, sensor code 92 incorporates features for each of these sensors, as will be further described. Execution of sensor code 92 may occur periodically within the framework of an overall routine which includes executing drive code 90. Of course, the speed of microprocessor 50 may, at least in part, establish how often the sensor code can be executed. In the present example, it is contemplated that the sensor code is executed at least every 10 ms. In this way, sensor output events having durations on the order of 20 ms are readily detectable. As will be discussed in further detail below, a fall of such duration will generally be harmless insofar as affecting hard drive 30, even in its most shock sensitive, data access mode.

Figure 2A:
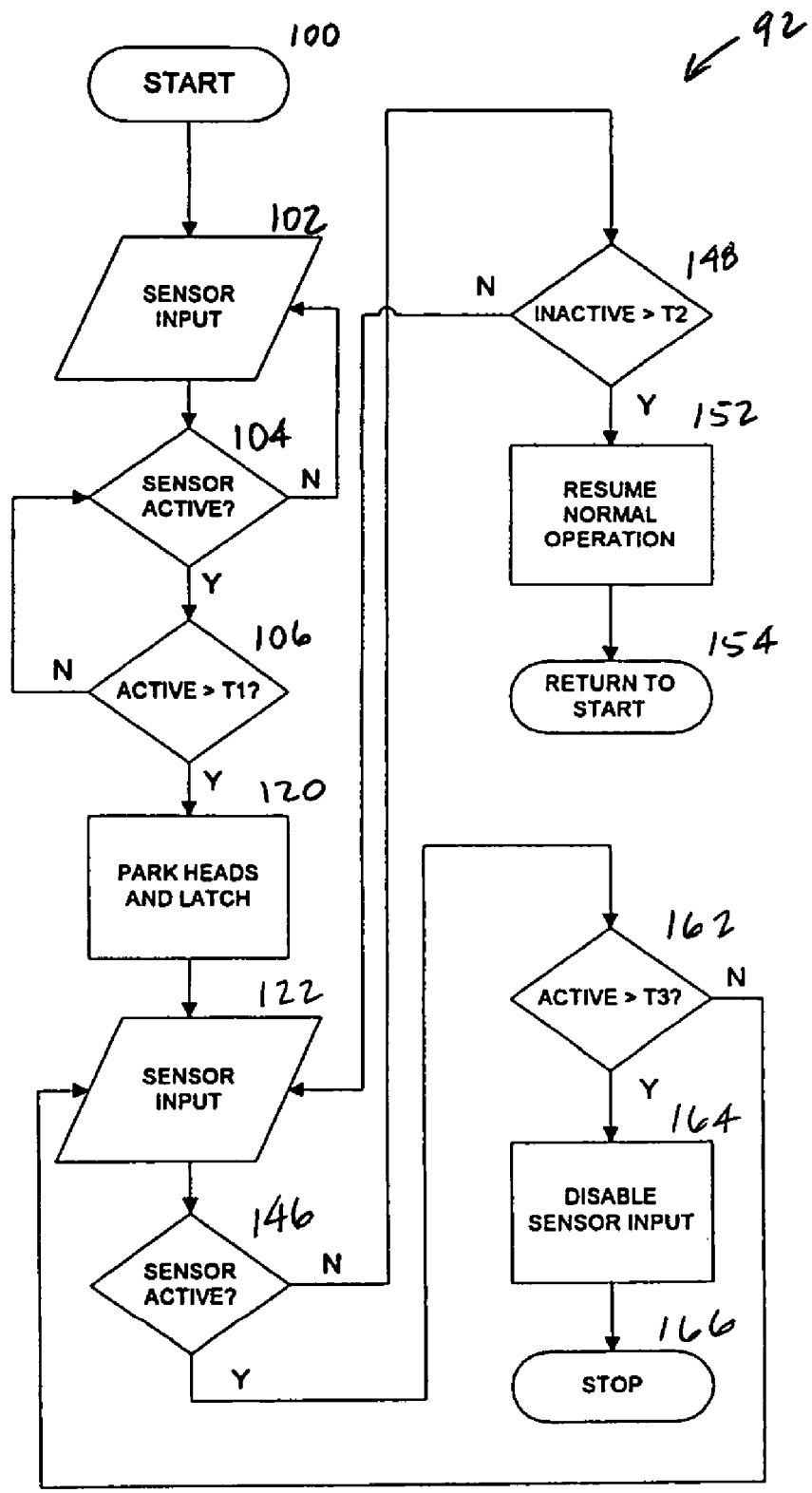
FIG. 2a is a flow diagram showing one exemplary technique for monitoring the hard drive sensor input that is illustrated in FIG. 1.

Referring to FIG. 2a in conjunction with FIG. 1, specific details with respect to one implementation of sensor code 92 will now be provided, as illustrated in FIG. 2a. The sensor code is entered at a start step 100 following which a sensor input 102 is established. A "sensor active" determination 104 is then performed to establish whether sensor 80 has been subjected to activity that is indicative of a reduced gravity condition. In this regard, and as will be further described, is noted that there are a number of activities or events which could generate sensor outputs that are indicative of a reduced gravity condition, but do not correspond to falling. Such "false signal" conditions may result, for example, when the user of a portable device is walking, jogging or performing some other form of exercise. If sensor activity is confirmed, step 106 compares the duration of the current pulse with a time interval T1. The latter is selected in a way which is intended to avoid reacting to limited time duration events that generally do not correspond to actual falls and may be selected in view of certain characteristics of a device, such as hard drive 30 that is the object of protection, as will be further described.

Referring to FIGS. 1, 2a and 3, the latter illustrates a sample output voltage V of sensor 80 along a timeline 110 beginning with pulses 112, 113, and 114, each of which is characterized by a time duration that is less than T1. Pulses 112, 113 and 114 are representative of transient effects that may be caused, for example, by running, walking or other activity which may impart a vertical component of movement to the host device. It is undesirable to respond to these transient effects as if they were drops. Further details will be provided below with respect to such transient effects and their characteristics. Thereafter, a pulse 116 occurs having a time duration that is greater than T1, as illustrated and corresponding to an actual drop. When a pulse having a duration that is greater than T1 occurs, step 120 is then initiated so as to immediately park or retract actuator 40 and its associated head 42 or heads. For a hard drive which utilizes an active latching arrangement, any appropriate activities may be performed that are necessary for latching the actuator in its parked position. Further, in order to minimize disruption of ongoing operations, any current data access is paused until such time that normal operations resume. Such a pause is available in data communication protocols over interfaces commonly used for hard disk drives (such as ATA, SCSI, CE-ATA, MMC-ATA) all include standard features which allow data transfer on the interface to be temporarily paused for mechanical related activities such as seeking, retries & error recovery and the like. Step 122 continues monitoring sensor 80, subsequent to the parking operation. At this point, it is generally desirable that actuator 40 remain parked, so long as the sensor continues to indicate a falling condition. An indication of the sensor status to the host device can be provided on a sensor status line 124 that is dedicated for that purpose. Any suitable number of such sensor status lines can be used to indicate to the host device a particular one of a number of possible conditions associated with a sensor and/or for purposes of providing information to the host with respect to a number of sensors. The use of one or more dedicated sensor status lines may be considered if the triggering event causes drive processor 50 to enter a wait condition such that the drive processor may not otherwise notify the host processor as to the cause of the current pause or wait status. Further, it should be appreciated that the number of sensor status lines can be limited, for example, by multiplexing sensor status information thereon.

It is of note that detecting a mere return of the sensor output to an inactive state may be a momentary event. That is, the host device may have impacted with the ground and then entered a bouncing phase. Such bouncing is illustrated, in FIG. 3, as producing sensor output pulses 130 and 132, representing subsequent drops between impacts 140 and 142.

Referring to FIGS. 2a and 4, the latter figure illustrates sensor output V plotted against another time line 144 for purposes of characterizing further potential behavior of the sensor output. In consideration of potential bouncing and similar such complex motions which can follow an actual drop, step 146 monitors the sensor output and, upon detecting an inactive status, routes operation to a step 148. In this case, the duration of the inactive interval is monitored and compared with an interval T2, illustrated in FIG. 4. Monitoring, in the present example, begins subsequent to a reduced gravity pulse 150 whereupon the host device encounters a "quiescent" environment 151 for a time duration that is greater in duration than interval T2. Responsive to this event, normal operation is resumed in step 152 and the monitoring process returns at step 154 to start 100. In restarting normal data access operations using hard drive 30, actuator 40 allowed to access disk arrangement 44 and any data accesses that were paused, responsive to a triggering event, are resumed and completed. Thereafter, pulses 156 and 158 will be ignored as having time durations that are less than T1. On the other hand, if no inactive event is longer than T2, decision step 148 causes continuing monitoring of the sensor signal at 122, waiting for environmental stabilization.

Figure 2B:
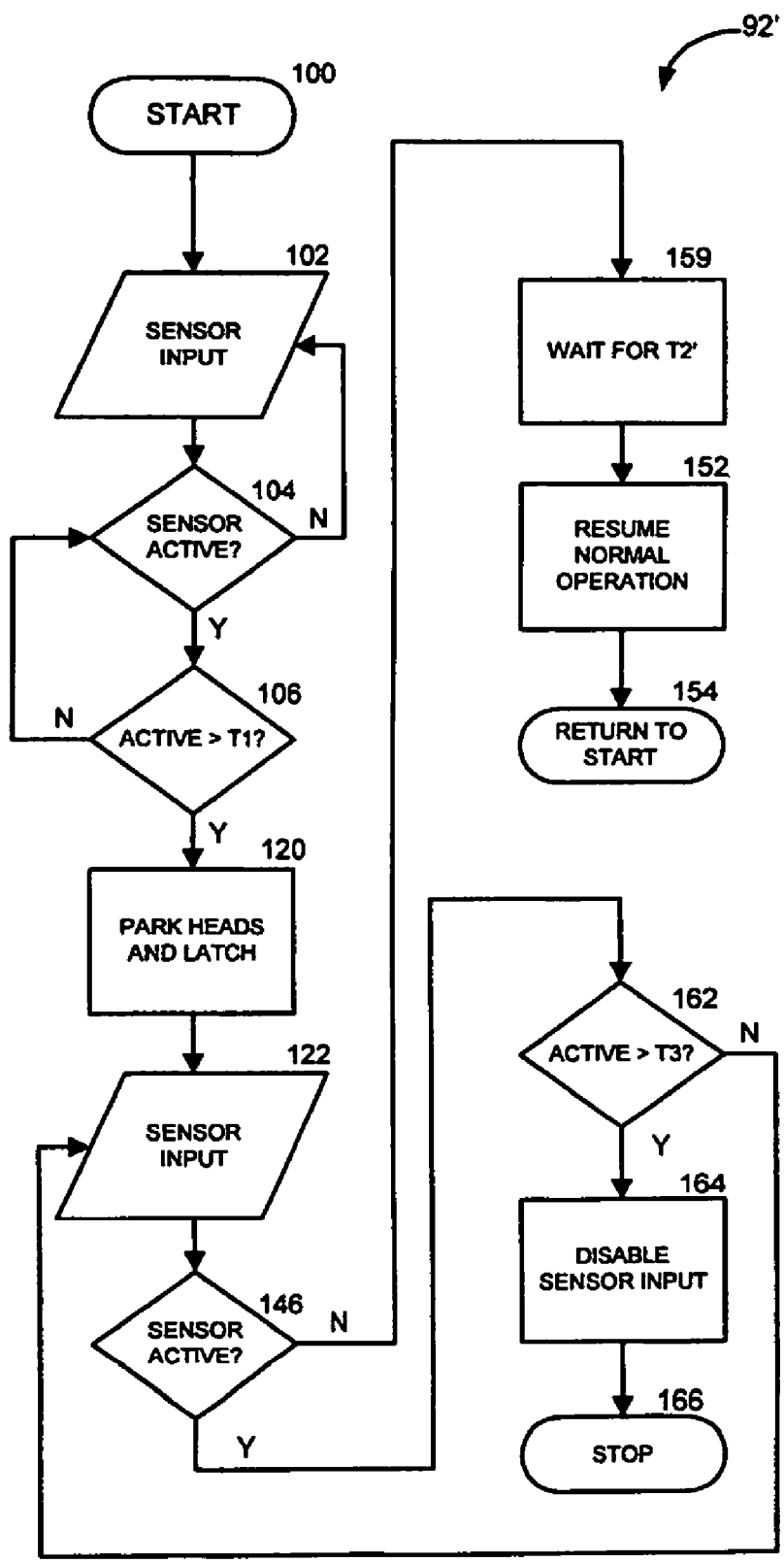
FIG. 2b is a flow diagram showing another exemplary technique for monitoring the hard drive sensor input that is illustrated in FIG. 1.

Referring to FIGS. 2b and 3, the former illustrates another technique, indicated by the reference number 92', which resembles the technique of FIG. 2a, except that subsequent to the first determination that the sensor is inactive in step 146 a waiting time period T2' is entered at step 159, as illustrated by a dashed line in FIG. 3, before normal operation resumes at step 152.

Referring to FIGS. 2a, 2b and 5, one concern resides in the possibility that the sensor could be defective by continuously, falsely indicating a reduced gravity state, thereby potentially causing operation to hang, responsive to what appears to be a fall of unlimited duration, as represented by timeline 160 of FIG. 5. In order to avoid this possibility, operation will flow to step 146 at which point it will be determined that the sensor is giving an active output. Step 162 then compares the current duration of the active event with a time interval T3. Once the active event exceeds T3, sensor input is disabled by step 164, and monitoring of the sensor is stopped at 166. In this way, host device functionality can be maintained, although at the expense of reduced protection from mechanical shock events. In this regard, the host device may issue a warning 168 on display 17 to the user, for example, warning the user not to expose the device to shock and to have the device serviced as soon as possible.

Having described the operation of sensor code 92 as part of the overall code that is executed by processor 50 in hard drive 30 of FIG. 1, it is now appropriate to discuss selection of appropriate values for time intervals T1, T2 (or T2') and T3, shown in FIGS. 3-5, respectively. To that end, Table 1 illustrates measured output pulse width durations, indicative of reduced gravity events, over a 20 second activity interval for selected physical activities. Mean and maximum pulse widths are given for each activity.

TABLE 1

Reduced Gravity Event Characterization for Various Activities

| Activity | Mean (ms) | Maximum (ms) |
| --- | --- | --- |
| Slow Walk | None | None |
| Fast walk | 13 | 101 |
| Very slow run | 277 | 436 |
| Slow run | 138 | 168 |
| Moderate run | 33 | 88 |
| Jumping jacks | 91 | 268 |
| Aggressive jumping jacks | 84 | 380 |
| Aggressive down stairs | 36 | 72 |

Of course, the data of Table 1 is relevant with respect to interval T1 of FIG. 3, such that an event of duration greater than T1 causes initiation of a parking sequence to protect the hard drive. It is of interest to note that a slow walk produced no sensor activity, while a very slow run produced the maximum duration pulse of 436 ms.

Figure 6:
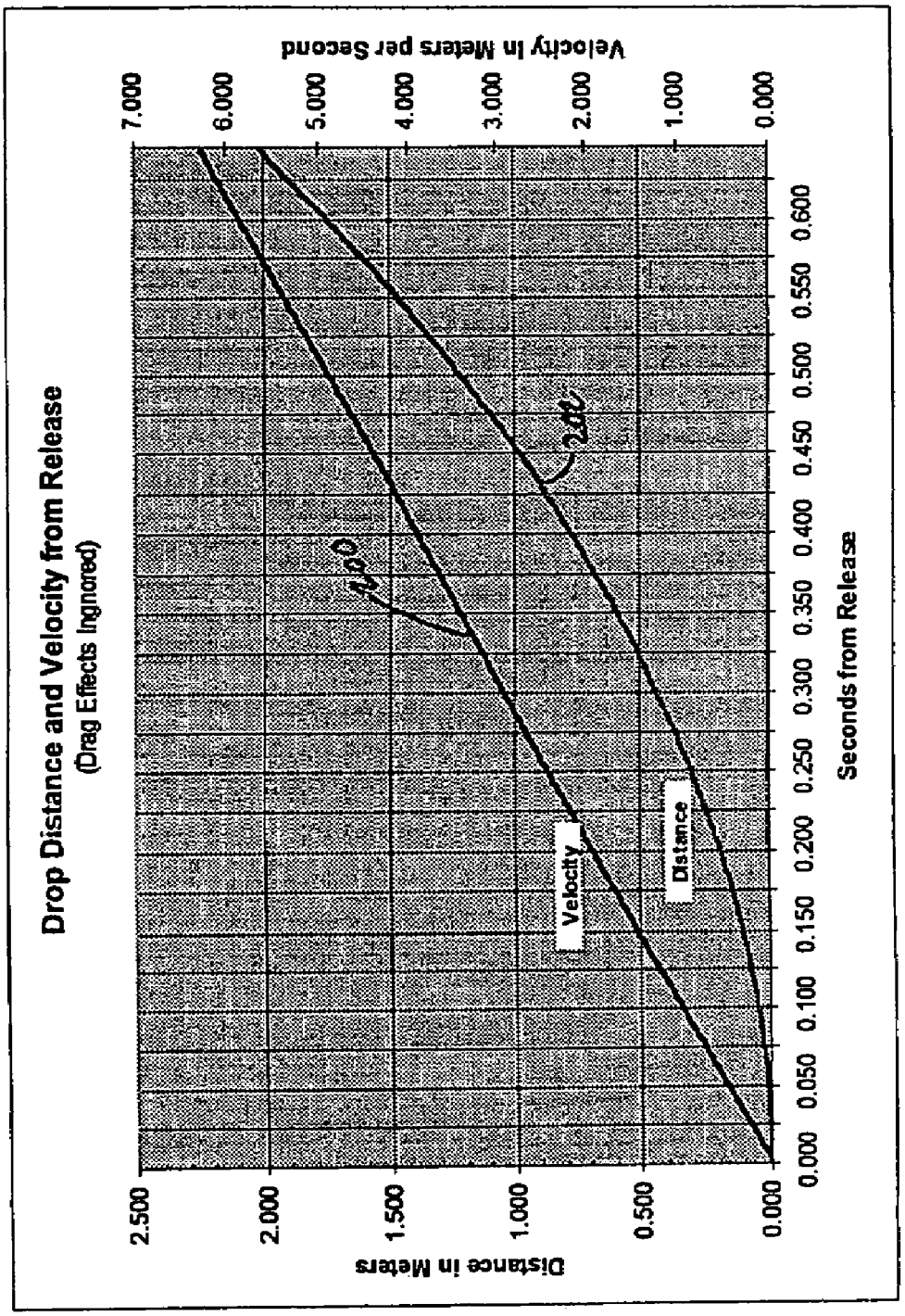
FIG. 6 is a dual plot of velocity and distance versus time from release for a host device that is dropped at time zero.

Referring to FIG. 6, it should be borne in mind that selection of any value for T1 will correspond to a particular drop height and velocity. FIG. 6 illustrates velocity 200 (using the rightmost vertical scale) and distance 202 (using the leftmost vertical scale) plotted against time and ignoring drag effects. Thus, selection of an appropriate value for T1 should be made at least in view of the data of Table 1, as well as the plots of FIG. 6. Accordingly, a useful range of values for T1 has been found to be from approximately 65 ms to approximately 320 ms. In this regard, it is assumed that 25 ms is required as a typical value for parking the hard drive actuator. Therefore, in the instance of selecting T1 as 65 ms, the actuator will be parked in approximately 90 ms, which corresponds to a drop height of approximately 4 cm. In the instance of selecting T1 as 320 ms, the actuator will be parked in approximately 345 ms, which corresponds to a drop height of approximately 58 cm. While it is at least somewhat unpredictable, it is often the case that a portable device will be dropped from heights that are greater than 58 cm, based on the average height at which a user might carry a portable device on a belt clip, arm band or held in the hand. One useful value for T1 is considered to be approximately 110 ms. With a 25 ms head retract time, this yields a protected drop height of approximately 9 cm.

Further with regard to selection of the value for T1, it is noted that there will generally be some identifiable maximum height from which the host device can be dropped, while hard drive 30 is in its data access mode, without subjecting the hard drive to a damaging g force. This height may be referred to hereinafter as a "maximum safe operational drop height". Accordingly, a drop from any height that is equal to or less than the maximum safe operational drop height generally will not damage hard disk 30, even though it is in its data access mode, by subjecting the device to no more than a maximum operational shock value. The maximum safe operational drop height may be used as being determinative of T1 or may serve as a factor in setting T1, in view of other data such as, for example, the information presented in Table 1. An example of the maximum operational shock value might be 150 g. By way of comparison, hard drive 30, in its protected mode with its actuator parked, may be capable of withstanding up to approximately 1500 g. It should be appreciated that the difference between these two values represents an order of magnitude, which is significant with respect to providing for enhanced protection from mechanical shock events.

The value T2, which may be referred to as a "head reload time" may be selected, for example, in a range of values that extends from approximately 100 ms to 2500 ms. One useful value has been found to be approximately 1000 ms. It is noted that these values may likewise be used for T2'. The head reload time may be selected based on a variety of factors including, but not limited to the height of the fall, the type of surface being dropped onto, affordable safely margin, and the like. Generally, T2 corresponds to a quiescent time period which, for a particular application, should be at least somewhat indicative of a stable environment following a drop event. It should be appreciated that T2 can be determined using an empirical technique for a given device, for example, by test dropping the device repeatedly to establish a desired safety margin.

With regard to T3, which may be referred to as a "bad sensor detect time", a value in a range from approximately 200 ms to 5000 ms may be used. One useful value has been found to be approximately 1000 ms. It is noted that this time period corresponds to a drop height of approximately 4.9 meters. Generally, T3 can be selected as long enough to be reasonably certain that the device will not survive the drop. With regard to the selection of T3, an empirical technique can readily be employed to establish acceptable values for a given device, for example, using test drops of the given device.

Selected values for T1-T3 may be set in any suitable manner such as, for example, through the use of the well-known technique of vendor unique commands which allow the host to communicate these values through the interface to the disk drive. In one implementation, default values can be set in firmware for each of these values, which remain in force until new values are selected to replace the default values. Moreover, an additional register value can be used to selectively turn sensor line 82, of FIG. 1, off and on, as desired, for example, via a vendor unique command.

Referring again to FIG. 1, it should be appreciated that sensor 80 is not located within hard drive 30. This configuration is considered to be useful with respect to certain conditions that may be encountered by a host device during a fall. In particular, falls that include rotation can expose sensor 80 to centripetal accelerations that will appear to the sensor as gravity. In other words, such centripetal accelerations can induce a false gravity condition whereby sensor 80 will fail to produce a reduced gravity output when, in fact, it should produce a reduced gravity output. It is recognized by the prior art that the sensor can be positioned at or proximate to the center of rotation of the host device to reduce or altogether eliminate concerns with respect to centripetal accelerations. The hard disk drive, described herein, specifically accommodates external sensor positioning, since it would indeed be rare for the center of rotation of the host device to coincide with a location that is inside the hard disk drive. This is particularly applicable with respect to small form-factor drives that are generally so light as to not play an overly significant role in shifting the center of rotation toward themselves. Further, even if the center of rotation of the host device happened, on occasion, to fall within the hard disk drive, such drives currently include a form factor that would generally accommodate positioning the sensor external to the hard disk drive, but nonetheless very near the center of rotation.

Figure 7:
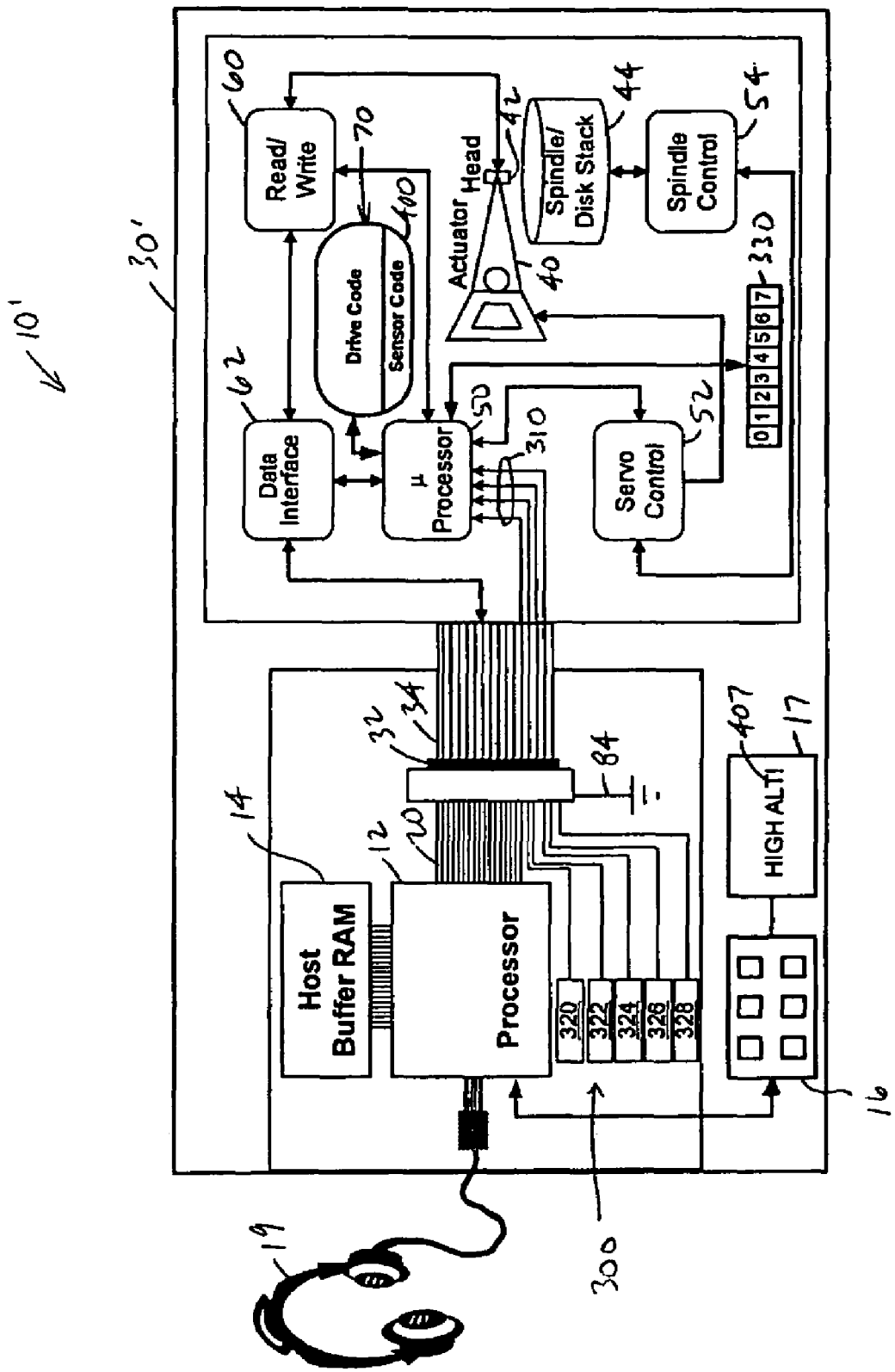
FIG. 7 is a is a block diagram of an alternative embodiment of a host device and hard disk drive, that is housed in the host device, shown here to illustrate the use of a dedicated sensor interface which forms part of the hard

Attention is now directed to FIG. 7 which illustrates an alternative embodiment of a host device that is generally indicated by the reference number 10'. Because embodiment 10' shares many components with host device 10 of FIG. 1, descriptions of these shared components will not be repeated for purposes of brevity. Host device 10', however, includes a sensor arrangement or array that is generally indicated by the reference number 300 and another embodiment of a hard disk drive, indicated by the reference number 30'. Hard drive 30' has many components in common with previously described hard drive 30 of FIG. 1. Hence, descriptions of these common components have not been provided, for purposes of brevity. Sensor arrangement 300 includes a plurality of sensors that are suitably located within host device 30'. A dedicated sensor electrical interconnection arrangement 310 is used to connect each of sensors 320, 322, 324, 326 and 328 to microprocessor 50, via interface 20. In particular, sensor electrical interface 310 one electrical conductor for use in carrying a sensor signal from its associated sensor, in cooperation with ground connection 84, to microprocessor 50. While four sensors have been shown in FIG. 7, it is to be understood that any suitable number and/or combination of sensors can be used. Further, appropriate signal conditioning may be performed with respect to any sensor that is employed. For example, circuitry may be provided to convert an analog sensor output to digital form.

As one option, a sensor status register 330 can be used by microprocessor 50 for purposes of storing information relating to the indications provided by the various sensors in any desired combination. In the present example, status register 330 includes bits 0-7, although it is to be understood that any suitable number of registers and bits may be used for access by the host. Host processor 12 access may be provided, for example, by using vendor unique commands to read status register 330 in a manner that will be evident to one having ordinary skill in the art in view of this disclosure. The host can query the status register at regular or predetermined intervals or may if the host detects pauses or delays in a data transfer. It should be appreciated that the use of status register 330 by the host processor, for example, to generate indications to the user is an activity that does not affect the use of sensor information for purposes of protecting the hard drive in the first instance.

Still referring to FIG. 7, as mentioned above, it is recognized herein that other factors, in addition to mechanical shock, can influence the operability and survivability of a hard disk drive. Moreover, these factors are recognized as being of increasing importance in view of the increasing applications of hard disk drives, particularly miniature hard disk drives, in portable devices such as, for example, cellular telephones, portable music players, GPS systems and the like. As examples of such factors, pressure and temperature can be sensed within the host device. Both pressure and temperature are of importance, since these factors influence the operation of a hard disk drive with respect to the capability of the head or heads to fly above the surface of an associated disk. That is, fly height decreases with decreasing pressure and also decreases with increasing temperature, since a temperature increase results in a corresponding air density decrease. Pressure reductions can occur on a regular basis, for example, as a result of travel through mountainous terrain or in unpressurized aircraft cabins, and are likely to be critical in influencing device operation at higher elevations, for example, above 4,572 m. In this regard, small form factor, miniature hard disk drives may be more sensitive to pressure reductions, as compared to larger form factor "desk top" drives, at least due to relatively lower rotational velocity. Further, low temperature and high pressure conditions can also be problematic with respect to the operation of a hard disk drive. Accordingly, these latter conditions can be monitored and, in combination with high temperature and low pressure, an acceptable temperature range and an acceptable pressure range can be utilized such that the drive can be parked responsive to out-of-range conditions. In this regard, as mentioned above, status register 330 can be used in any suitable manner. For example, one bit could represent that a sensor is providing a reading that is below some predetermined threshold or range, while another bit could represent that the same sensor is providing a reading that is above some threshold or range. Alternatively, one bit can indicate that an out of range reading is being provided. The latter may be the case, for example, in the instance of a programmable form of sensor in which threshold levels are programmed into the sensor or the sensor requires initialization. Such programming can be performed, for example, by the host processor.

Another type of sensor that can be used, either alone or as part of the sensor array, is a magnetic field sensor. Any suitable type of sensor that is capable of sensing a magnetic field may be used such as, for example, a Hall effect sensor. U.S. patent application Ser. No. 11/327,765, entitled SYSTEM INCLUDING A DISK DRIVE, STRAY MAGNETIC FIELD SENSOR AND ASSOCIATED METHOD, filed contemporaneously herewith, includes material related to the use of a magnetic sensor, for example, as part of a sensor array and is therefore incorporated herein by reference in its entirety. Applicants recognize that a hard disk drive, particularly a small form factor drive, can be subjected to stray magnetic field environments. If the field is relatively weak (but above a certain threshold), then there might only be a temporary degradation in performance such as reduced data transfer rate because of errors and retries in reading the data from the disk. In this case, the performance degradation would be alleviated once the stray field reduces. In other words, there is no permanent damage to the disk drive.

If the field is moderate, then the disk drive could experience severe difficulty in reading data from the disk (or severe difficulty in writing to the disk, if a write operation is requested by the host)—severe to the point where the read or write operations may fail and result in errors reported to the host. In this moderate case, the errors/problems would also be alleviated once the stray field reduces. Again, there is no permanent damage to the disk drive.

If the magnetic field is strong, however, the disk drive will experience severe difficulty in reading data from the disk (or severe difficulty in writing to the disk if a write operation is requested by the host)—severe to the point where the read or write operations will fail and result in errors reported to the host. Also, certain data on the disk will become damaged and lost due to magnetic erasure from the stray magnetic field. The damaged data could be "user data" in the sense of data sectors normally written/read by the host system, but the damaged data could also be the highly critical servo data. Loss of the servo data could result in catastrophic failure of the disk drive. Loss of enough user data could also result in catastrophic failure of the host system. In this severe case, the damage is permanent and the functional problems will persist even after the stray field reduces.

It should be appreciated that relatively strong stray magnetic fields can be produced in a number of different ways such as, for example, by store security devices, magnetic cover clips on carrying pouches and the like. While not intending to be bound by theory, it is thought that in the severe stray field case the shielding structures in the magnetic read/write heads can "capture" flux from the stray field, and focus the flux down onto the disk (when the disk drive is operational). If the stray field is strong enough, then enough flux can be focused to demagnetize the data written on the disk. Since all disk drives use similar head technology, all disk drives are relatively similar in their sensitivity to stray magnetic fields.

Figure 11:
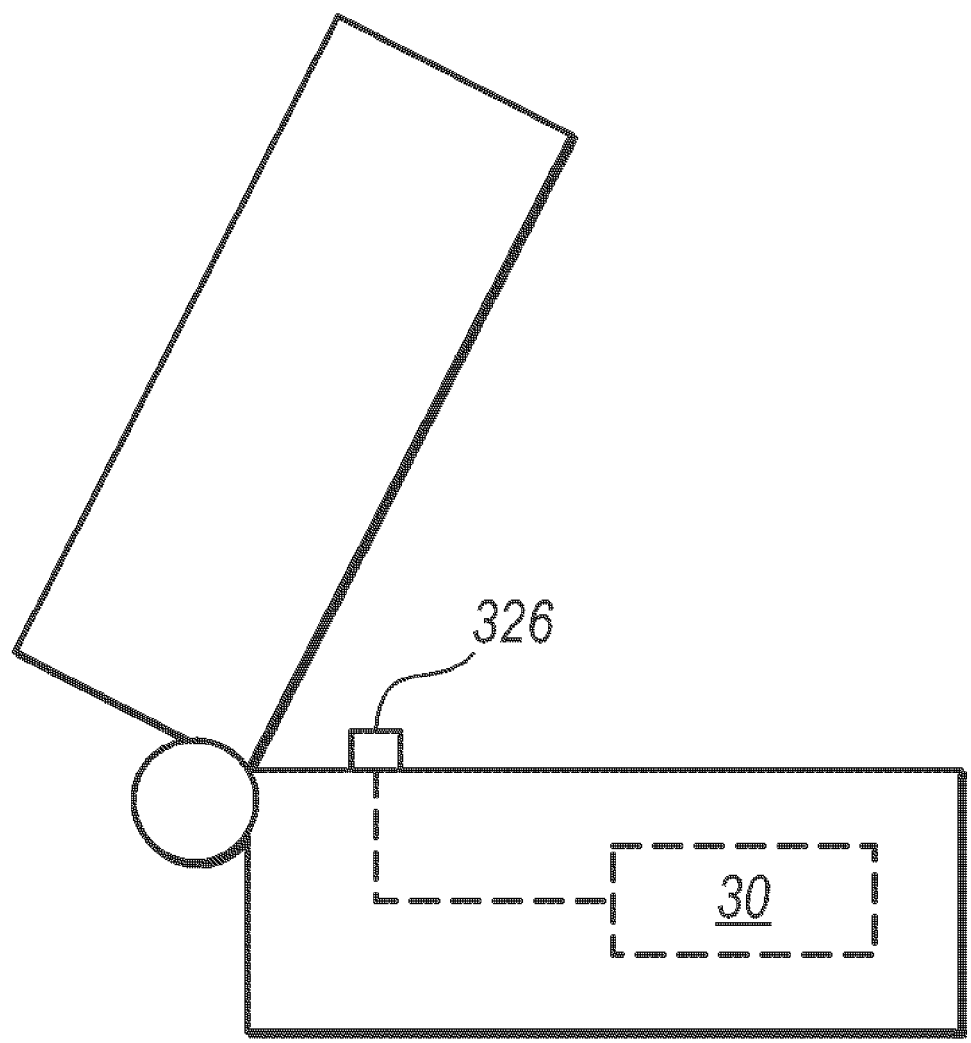
FIG. 11 illustrates a two-piece housing having a housing switch.

Other forms of sensor signals are also of value. For example, there may be attributes of the portable device itself which are worthy of monitoring. The "clamshell" hinged design of cellular telephones, having the keypad and microphone on one housing portion, while the ear piece and display are generally located on the opposing housing portion, is of some concern. When the opposing housing portions of the cellular telephone are moved from an open position to a closed position, a significant mechanical shock event can occur that could exceed the maximum operational shock value. One expedient with respect to anticipation of this event resides in the use of a housing switch which closes at some appropriate point as the two opposing housing portions are moved from the open position to the closed position. (See FIG. 11) Thus, closing or actuation of the housing switch is anticipatory with respect to the impact that may occur between the two housing positions once the closed position is reached.

Thus, any suitable sensors may be used in sensor group 300 of FIG. 7 including, but not limited to switches, accelerometers (i.e., freefall sensors), temperature sensors, pressure sensors and magnetic field sensors, in any suitable combination. In the present example, the use of a freefall sensor 320, a pressure sensor 322, a temperature sensor 324, a housing switch 326 and a magnetic field sensor 328 is contemplated. Microprocessor 50 may monitor sensor arrangement 300 in many alternative ways, one of which is described immediately hereinafter.

Figure 8:
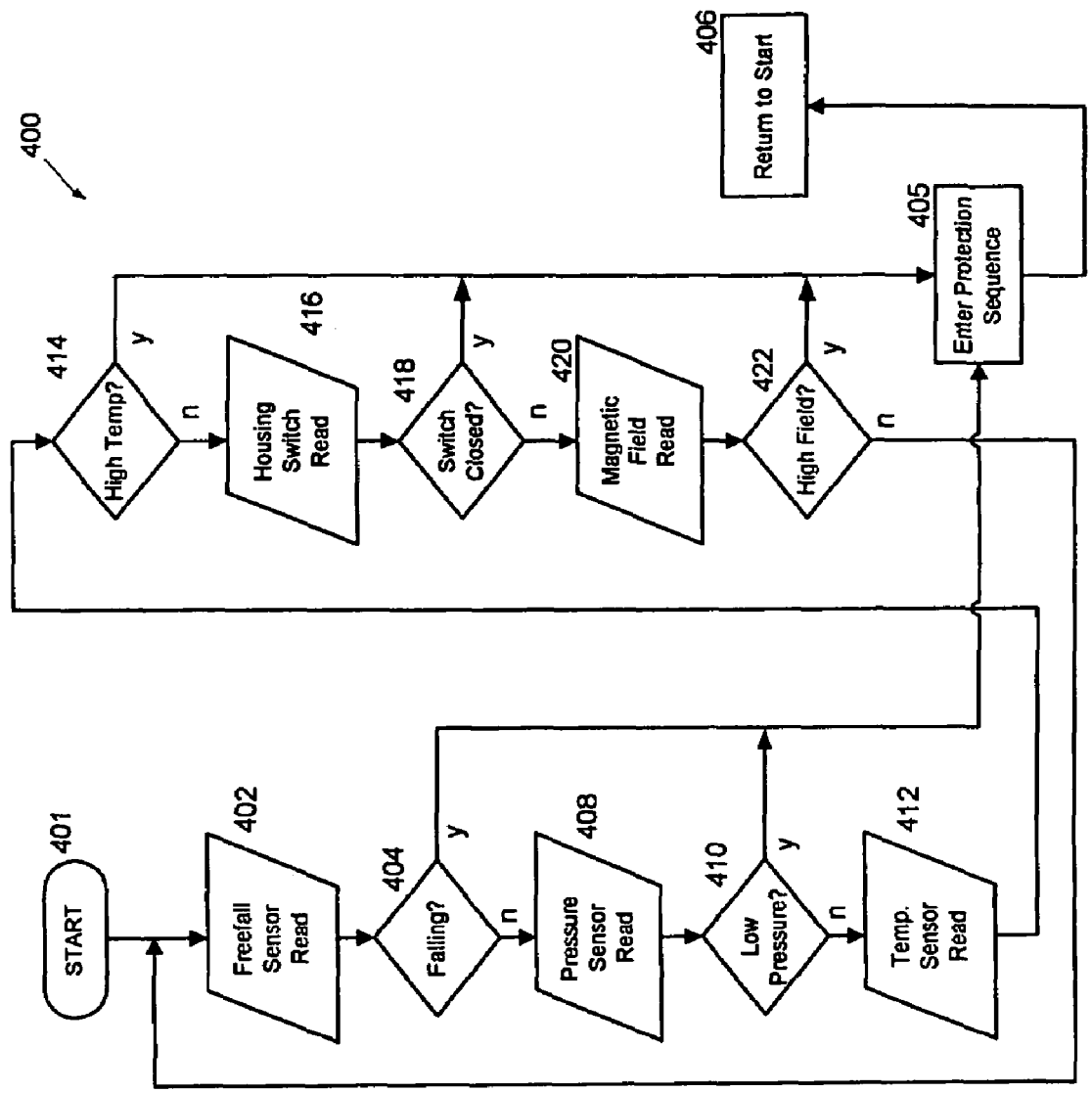
FIG. 8 is a flow diagram which illustrates one implementation of sensor code for monitoring a sensor arrangement, from the hard disk drive, having a plurality of sensors.

Turning now to FIG. 8, in conjunction with FIG. 7, attention is directed to another embodiment of sensor code that is generally indicated by the reference number 400 and used in the embodiment of FIG. 7. Sensor code 400 begins with start 401. Thereafter, at 402 freefall sensor 320 input is detected. Step 404 then determines whether a freefall event is taking place, for example, by using attributes of sensor code 92 of FIG. 2a or 2b. In the case that a freefall event is indicated, at 405 a protection sequence is entered at least in which actuator 40 can be parked. Other operations may be performed, depending upon the specific configuration of the hard disk drive that is in use, such as causing an active latch arrangement to engage the actuator arm, as well as indicating the particular sensor that is causing the device to enter the protection mode. That is, the protection sequence is readily customized for each sensor that is used. As one example, the technique illustrated by FIG. 2a or 2b can readily form the basis of a detection and protection sequence for the use of a freefall sensor, as described above, including the use of above described intervals T1-T3. As part of protection sequence 405, status register 330 bits are set so as to reflect the current indications that are being provided by sensor array 300. For any sensor monitoring event which causes the actuator to park, an appropriate notification 407 can be provided on display 17 which, in the present example, is shown as "HIGH ALT!", but can be customized dependent upon the triggering sensor. Subsequent to protection mode 405, step 406 can return operation to start 401. If there is no indication of a freefall, step 408 reads pressure sensor 322. At 410, a determination is made by comparing the measured pressure to a threshold pressure to establish whether the measured pressure is less than the threshold pressure. If so, an appropriate protection sequence is entered at 405. On the other hand, if the measured pressure is equal to or greater than the threshold pressure, step 412 is then performed in which the output from temperature sensor 324 is read to provide a current temperature within the host device. At 414, the current temperature is compared to a threshold temperature. If the current temperature is greater than a threshold temperature, an appropriate protection sequence is entered at 405. As mentioned above, sensor high/low limits or out-of-range type indications can be generated based on sensor readings, where appropriate. Otherwise, operation moves to 416 which establishes the state of the housing switch. If the housing switch is closed, 418 causes an appropriate protection sequence to be entered at 405. If the housing switch is open, the foregoing monitoring sequence is repeated, starting with 402. Useful values of pressure thresholds are considered to be dependent on particular characteristics of the hard disk drive being protected, but are generally on the order of 428.75 mm Hg, corresponding to altitudes of greater than 4,572 m. Useful values of temperature thresholds are, likewise, considered to dependent on particular characteristics of the hard disk drive being protected, but are generally in the range of greater than 50 degrees C. At step 420, magnetic field sensor 328 is read and appropriate action is then taken on this reading at step 422, so as to enter protection mode 405 if an unacceptable magnetic environment is detected. In this particular embodiment of the protection mode, it may be appropriate to remained parked so long as the magnetic environment is unacceptable. It should be appreciated that monitoring of sensor group can be customized, for example, responsive to vendor unique commands. In this way, certain sensor inputs can be skipped and added back into the monitoring routine at any appropriate time. With respect to using technique 92 of FIG. 2a as the basis for a freefall protection sequence, it should be appreciated that the remaining sensor inputs can continue to be monitored by sensor code 400, even though the freefall sensor has been disabled. In this way, some level of protection continues by monitoring the other sensors within a sensor arrangement, irrespective of the fact that the freefall sensor is disabled.

Figure 9:
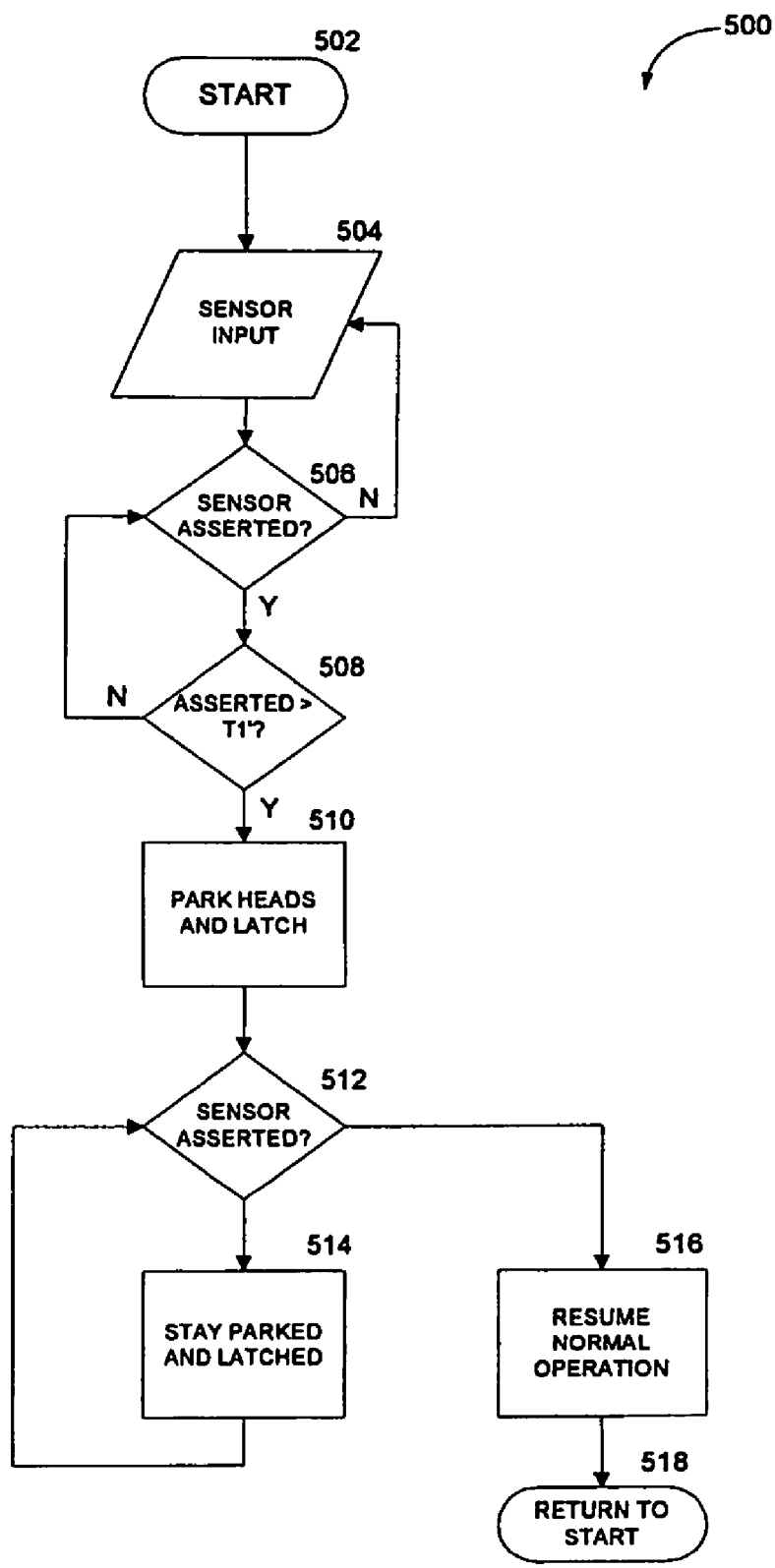

Referring to FIG. 9 a technique for responding to a pressure sensor, temperature sensor or magnetic field sensor is generally indicated by the reference number 500 and may readily form the basis of a protection sequence that branches off from either of steps 410 or 414 of FIG. 8, integrated within the overall sequence of FIG. 8. For purposes of clarity, the technique of FIG. 9 will be described as if a temperature, pressure or magnetic field sensor is being used individually, but one of ordinary skill in the art will readily adapt this technique for use in the context of multiple sensors in view of FIG. 8. Following start 502, 504 monitors the sensor input. In the present example, the use of either pressure sensor 322 (see FIG. 7) or temperature sensor 324 is contemplated. At 506, if the sensor signal is asserted, meaning that the sensor value is above some threshold value, below some threshold value or out of a selected range of values, operation proceeds to 508 which determines if the sensor value has been asserted for a time period that is greater than an interval T1'. In this regard, it should be appreciated that technique 500 essentially comprises a portion of technique 92 of FIG. 2a, thus T1' at least generally corresponds to T1 of FIG. 2a. If the sensor signal is asserted longer than T1', step 510 can park and latch the heads. Alternatively, steps 506 and 508 repeat until the sensor signal has been asserted greater than T1'. It should be appreciated that T1' can be set to a value of zero when there is a desire to respond as quickly as possible to a sensor value that has been asserted. Step 512 then confirms that the sensor value continues to be asserted. That is, so long as the reading is too high, it may be desired to remain in the parked position at step 514. Once the sensor value is acceptable, normal operation resumes at 516. Thereafter, 518 returns operations to start 502. It should be appreciated that technique 500 can be used for responding to any input for which the appropriate response to an unacceptable value is to remain parked, until the input value is acceptable.

Figure 10:
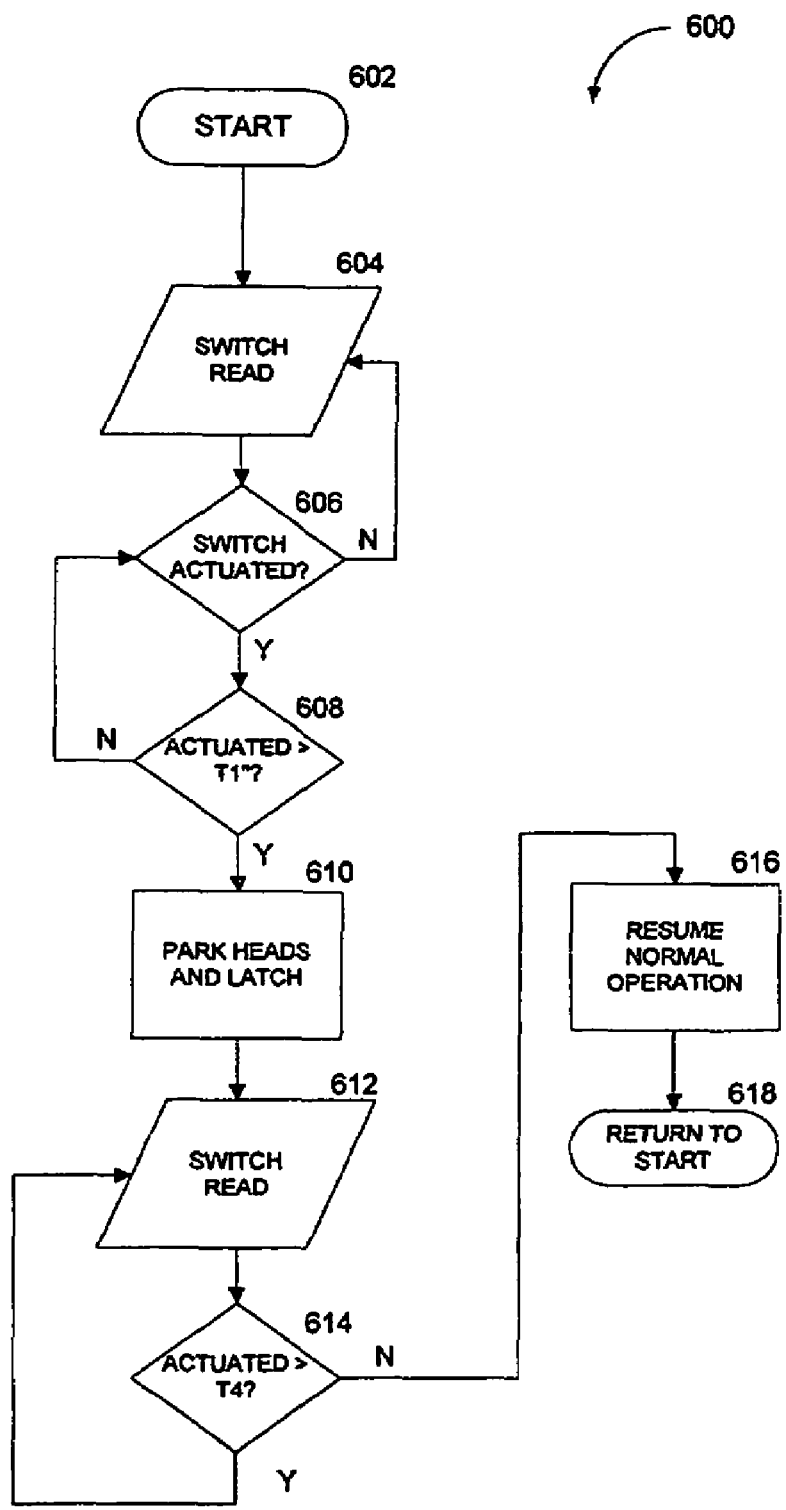

Referring to FIG. 10 a technique for responding to a housing switch signal is generally indicated by the reference number 600 and may readily form the basis of a protection sequence that branches off from step 418 of FIG. 8, integrated within the overall sequence of FIG. 8. For purposes of clarity, the technique of FIG. 10 will be described as if a housing switch is being used individually, but one of ordinary skill in the art will readily adapt this technique for use in the context of multiple sensors in view of FIG. 8. Further, for purposes of this example, it is assumed that the housing switch closes at some intermediate position as the two portions of the device housing are moved from an open or disengaged position to a closed or engaged position such that the event constituting closing of the housing switch is anticipatory with respect to the potential impact of the two portions of the device housing against one another. It is to be understood that opening of the housing switch can just as readily be used as this anticipatory signal. At 606, if the switch is closed, operation proceeds to 608 which can determine if the switch has been closed for a time period that is greater than an interval T1". In this regard, it should be appreciated that technique 600 essentially comprises a portion of technique 92 of FIG. 2a, thus T1" generally corresponds to T1 of FIG. 2a. Further, if no delay is desired with respect to responding to the switch signal, T1" can be set to zero, which essentially eliminates step 608, as is the case with all delay sequence steps described herein. Such delays may be of value with respect to avoiding an inadvertent response, for example, to an electrical or measurement related transient. Thus, if T1" is nonzero, the change of state of the housing switch is confirmed at least once. If the sensor signal is asserted longer than T1", step 610 can park and latch the heads. Alternatively, steps 606 and 608 repeat until the switch has been closed for longer than T1". At 612, the switch state is read again. Step 614 then tests to confirm that the housing switch is still closed for a time period corresponding to an interval T4. That is, it is desired to remain parked for time period T4, subsequent to the initial closure, which time period is long enough to allow the two portions of the device housing to complete their movement to the engaged position and for an induced mechanical shock event to have subsided. Once it is confirmed that the switch has been closed longer than T4, normal operation resumes at 616. Thereafter, 618 returns operations to start 602.

With respect to the prior art, Applicant is unaware of any prior art hard disk drive having a dedicated sensor interface or such a hard disk drive which can accommodate the monitoring techniques described above. Moreover, with respect to freefall embodiments, the prior art appears to focus on and be limited to monitoring an initial mechanical shock event or predictive freefall, as discussed above, but fails to continue monitoring, subsequent to the initial event, in the way that is taught herein. In particular, by monitoring for a quiescent mechanical shock environment after an initial impact, so as to avoid subsequent mechanical shock due to bouncing and by monitoring for a defective freefall sensor.

The state-of-the-art is considered as being limited in other ways. For example, the Comerford patent teaches the need for a dedicated processor solely for the purpose of monitoring sensor output. Further, it is submitted that the arrangement taught by Comerford is disadvantageous since it relies on the use of the host device processor in conjunction with the dedicated processor. As illustrated with respect to afore-described FIG. 1, these requirements are swept aside by allowing the use of a single processor which monitors the overall operation of the hard drive, while responding to the sensor arrangement, although there is no specific requirement to do so in combination with the other features that have been brought to light herein. The embodiment described here avoids the need for host processor code modifications to accommodate running sensor code. In this regard, it should be appreciated that this advantage obtains even if a dedicated sensor monitoring processor is provided within the hard disk drive, as opposed to within the host device. In effect, a hard drive is provided that is smart with respect to its own unique and dedicated sensor interface, which can be customized in view of any suitable type of sensor or combination of sensors that is to be monitored.

It is to be understood that at least the following concepts are considered to be enabled by the foregoing description.

1. A hard disk drive, comprising:
a read/write disk for storing digital data;
a spindle motor supporting said read/write disk for controlled rotation thereof;
a head arrangement configured for movement to selectively access the read/write disk in a data access mode and for movement to a parked position;
a first dedicated input that is dedicated for receiving a first sensor related input signal; and
a processing arrangement for (i) executing said data access mode by cooperatively controlling said spindle motor and said head arrangement, (ii) monitoring said first sensor related input signal for a first predetermined characteristic thereof, and (iii) responsive to detection of said first predetermined characteristic, at least moving the head arrangement to said parked position.

2. The hard disk drive of claim 1 wherein said processing arrangement includes a single CPU.

3. The hard disk drive of claim 1 including an electrical interface that is made up of a plurality of electrical connections including a common ground connection and wherein no more than one of said electrical connections carries said first sensor related input signal relative to said common ground connection.

4. The hard disk drive of claim 3 wherein said processing arrangement is configured for activating the first dedicated input, responsive to a vendor unique command that is issuable through said electrical interface, other than said first dedicated input.

5. The hard disk drive of claim 1 wherein said processing arrangement is configured for user selectable activation of said first dedicated input when the hard disk drive arrangement is installed in a host device.

6. The hard disk drive of claim 1 including an overall set of instructions that is executed by said processing arrangement to serve in operating the hard disk drive, including a subset of said overall set of instructions for monitoring said first dedicated input and responding to the predetermined characteristic of the first sensor related input signal.

7. The hard disk drive of claim 1 wherein said predetermined characteristic of the first sensor related input signal includes a first minimum time duration that is indicative of a potential falling status of the hard disk drive which is established based on a selected value of the first sensor related input signal that is indicative of said potential falling status, in conjunction with said selected value being present at least for said first minimum time duration and said processing arrangement is further configured for maintaining said head arrangement in the parked position so long as the first sensor related input signal remains at the selected value, subsequent to initially moving the head arrangement to the parked position.

8. The hard disk drive of claim 7 wherein the first sensor related input signal is a digital signal and the selected value of the first sensor related input signal is a first one of two digital states, that are opposite with respect to one another, and said processing arrangement is further configured for detecting an initial occurrence of a second one of the two digital states while maintaining said head arrangement in the parked position and, responsive to detecting the second digital state, monitoring said first sensor related input signal for any return to said first digital state, during a second minimum time duration that is measured from said initial occurrence of the second digital state, while continuing to maintain the head arrangement in said parked position over the second minimum time duration.

9. The hard disk drive of claim 8 wherein the second minimum time duration is user selectable.

10. The hard disk drive of claim 8 wherein the second minimum time duration is in a range from 100 milliseconds to 2500 milliseconds.

11. The hard disk drive of claim 10 wherein the second minimum time duration is approximately 1000 milliseconds.

12. The hard disk drive of claim 1 wherein said first dedicated input is in electrical communication with a pressure sensor that is located within the host device so as to produce a pressure signal at said dedicated input and said first predetermined characteristic of the sensor related input signal is a minimum pressure such that the head arrangement is moved to the parked position responsive to detection of said minimum pressure.

13. The hard disk drive of claim 1 wherein said first dedicated input is in electrical communication with a temperature sensor that is located within the host device so as to produce a temperature signal at said dedicated input and said first predetermined characteristic of the sensor related input signal is a minimum temperature such that the head arrangement is moved to the parked position responsive to detection of said minimum temperature.

14. The hard disk drive of claim 1 wherein said first dedicated input is in electrical communication with a housing switch that is located within the host device so as to produce a switch signal at said dedicated input and said first predetermined characteristic is a change in state of the switch signal responsive to a user actuation of the host device such that the head arrangement is moved to the parked position responsive to the switch signal.

15. The hard disk drive of claim 14 configured for immediately moving the head arrangement to the parked position, responsive to said change of state of the housing switch.

16. The hard disk drive of claim 14 configured for confirming said change of state of the switch signal at least once prior to moving the head arrangement to the parked position.

17. The hard disk drive of claim 1 wherein said first dedicated input is in electrical communication with a magnetic field sensor that is located within the host device so as to produce a magnetic field signal at said dedicated input and said first predetermined characteristic of the sensor related input signal is a maximum field strength such that the head arrangement is moved to the parked position responsive to detection of said maximum field strength.

18. The hard disk drive of claim 1 further comprising at least a second dedicated input for receiving a second sensor related input signal and said processing arrangement is further configured for monitoring a second predetermined characteristic of the second sensor related input signal and responsive thereto, at least moving the head arrangement to the parked position.

19. The hard disk drive of claim 18 wherein said first sensor related signal is responsive to detection of a falling condition of the host device and said second sensor related signal is responsive to detection of pressure within the host device.

20. The hard disk drive of claim 18 further comprising at least one additional input for receiving an additional sensor related input signal and said processing arrangement is further configured for monitoring an additional predetermined characteristic of the additional sensor related input signal and, responsive thereto, at least moving the head arrangement to the parked position.

21. The hard disk drive of claim 20 wherein said processing arrangement is configured for using said first sensor related signal responsive to a falling condition of the hard disk drive, said second sensor related signal responsive to a pressure measurement within the host device and said additional sensor related signal responsive to a temperature measurement within the host device.

22. The hard disk drive of claim 1 wherein said sensor related input signal is produced by a sensor that is located in the host device, in electrical communication with said input, and wherein said processing arrangement is further configured for monitoring said sensor related input signal in a way which identifies an at least potential failure of said sensor.

23. The hard disk drive of claim 22 wherein said processing arrangement identifies said failure, responsive to detection of a particular characteristic of said sensor related input signal.

24. The hard disk drive of claim 23 wherein said particular characteristic is indicative of a potential falling status of the hard disk drive in conjunction with a particular minimum time duration.

25. The hard disk drive of claim 24 wherein said particular minimum time duration is at least 1 second.

26. A hard disk drive for operation in an environment that may subject the hard disk drive to a given mechanical shock, said hard disk drive arrangement comprising:

a read/write disk for storing digital data;

a spindle motor supporting said read/write disk for controlled rotation thereof;

a head arrangement configured for movement to access the read/write disk in a data access mode and for movement to a parked position as part of a protected mode such that the hard disk drive arrangement is not susceptible to said given mechanical shock in the protected mode and is susceptible to the given mechanical shock in the data access mode;

a dedicated input that is dedicated for receiving a sensor related input signal; and a processor for (i) executing said data access mode, by cooperatively controlling said spindle motor and said head arrangement, (ii) monitoring the sensor related input signal for a predetermined characteristic thereof and (iii) responsive to detection of said predetermined characteristic of the sensor related input signal, causing the hard disk drive to enter said protected mode at least by moving said head arrangement to the parked position.

27. A method for producing a hard disk drive, said method comprising:

providing a read/write disk for storing digital data;

supporting said read/write disk using a spindle motor for controlled rotation thereof;

providing a head arrangement for movement to selectively access the read/write disk in a data access mode and for movement to a parked position;

configuring a first dedicated input for receiving a first sensor related input signal; and using a processing arrangement for (i) executing said data access mode by cooperatively controlling said spindle motor and said head arrangement, (ii) monitoring said first sensor related input signal for a first predetermined characteristic thereof, and (iii) responsive to detection of said first predetermined characteristic, at least moving the head arrangement to said parked position.

28. The method of claim 27 including configuring said processing arrangement to include a single CPU.

29. The method of claim 27 including forming an electrical interface, as part of the hard disk drive, that is made up of a plurality of electrical connections including a common ground connection so that no more than one of said electrical connections carries said first sensor related input signal relative to said common ground connection.

30. The method of claim 27 including using an overall set of instructions, that is executed by said processing arrangement, to serve in operating the hard disk drive, and using a subset of said overall set of instructions for monitoring said first dedicated input and responding to the predetermined characteristic of the first sensor related input signal.

31. The method of claim 27 wherein said predetermined characteristic of the first sensor related input signal includes a first minimum time duration that is indicative of a potential falling status of the hard disk drive which is established based on a selected value of the first sensor related input signal that is indicative of said potential falling status, in conjunction with said selected value being present at least for said first minimum time duration and configuring said processing arrangement for maintaining said head arrangement in the parked position so long as the first sensor related input signal remains at the selected value, subsequent to initially moving the head arrangement to the parked position.

32. The method of claim 31 wherein the first sensor related input signal is a digital signal and the selected value of the first sensor related input signal is a first one of two digital states, that are opposite with respect to one another, and further configuring said processing arrangement for detecting an initial occurrence of a second one of the two digital states while maintaining said head arrangement in the parked position and, responsive to detecting the second digital state, monitoring said first sensor related input signal for any return to said first digital state, during a second minimum time duration that is measured from said initial occurrence of the second digital state, while continuing to maintain the head arrangement in said parked position over the second minimum time duration.

33. The method of claim 27 wherein said first dedicated input is in electrical communication with a pressure sensor that is located within the host device so as to produce a pressure signal at said dedicated input and said first predetermined characteristic of the sensor related input signal is a minimum pressure such that the head arrangement is moved to the parked position responsive to detection of said minimum pressure.

34. The method of claim 27 wherein said first dedicated input is in electrical communication with a temperature sensor that is located within the host device so as to produce a temperature signal at said dedicated input and said first predetermined characteristic of the sensor related input signal is a minimum temperature such that the head arrangement is moved to the parked position responsive to detection of said minimum temperature.

35. The method of claim 27 wherein said first dedicated input is in electrical communication with a housing switch that is located within the host device so as to produce a switch signal at said dedicated input and said first predetermined characteristic is a change in state of the switch signal responsive to a predetermined actuation of the host device such that the head arrangement is moved to the parked position responsive to the switch signal.

36. The method of claim 27 wherein said first dedicated input is in electrical communication with a magnetic field sensor that is located within the host device so as to produce a magnetic field signal at said dedicated input and said first predetermined characteristic of the sensor related input signal is a maximum field strength such that the head arrangement is moved to the parked position responsive to detection of said maximum field strength.

37. The method of claim 27 further comprising configuring at least a second dedicated input for receiving a second sensor related input signal and further configuring said processing arrangement for monitoring a second predetermined characteristic of the second sensor related input signal and responsive thereto, at least moving the head arrangement to the parked position.

38. The method of claim 37 wherein said first sensor related signal is responsive to detection of a falling condition of the host device and said second sensor related signal is responsive to detection of pressure within the host device.

39. The method of claim 37 further comprising providing at least one additional input for receiving an additional sensor related input signal and further configuring said processing arrangement for monitoring an additional predetermined characteristic of the additional sensor related input signal and, responsive thereto, at least moving the head arrangement to the parked position.

40. The method of claim 39 including configuring said processing arrangement for using said first sensor related signal responsive to a falling condition of the hard disk drive, said second sensor related signal responsive to a pressure measurement within the host device and said additional sensor related signal responsive to a temperature measurement within the host device.

41. The method of claim 27 wherein said sensor related input signal is produced by a sensor that is located in the host device, in electrical communication with said input, and further configuring said processing arrangement for monitoring said sensor related input signal in a way which identifies an at least potential failure of said sensor.

42. The method of claim 41 including causing said processing arrangement to identify said potential failure, responsive to detection of a particular characteristic of said sensor related input signal.

43. The method of claim 42 wherein said particular characteristic is indicative of a potential falling status of the hard disk drive in conjunction with a particular minimum time duration.

44. A method for producing a hard disk drive for operation in an environment that may subject the hard disk drive to a given mechanical shock, said method comprising:
providing a read/write disk for storing digital data;
supporting the read/write disk using a spindle motor for controlled rotation thereof;
providing a head arrangement for movement to access the read/write disk in a data access mode and for movement to a parked position as part of a protected mode such that the hard disk drive arrangement is not susceptible to said given mechanical shock in the protected mode and is susceptible to the given mechanical shock in the data access mode;
configuring a dedicated input for receiving a sensor related input signal; and
using a processor for (i) executing said data access mode, by cooperatively controlling said spindle motor and said head arrangement, (ii) monitoring the sensor related input signal for a predetermined characteristic thereof and (iii) responsive to detection of said predetermined characteristic of the sensor related input signal, causing the hard disk drive to enter said protected mode at least by moving said head arrangement to the parked position.

45. In a host device that includes a housing that is operable by a user in a way which produces a mechanical shock to which at least a particular component of the host device is sensitive in an operating mode and which is less sensitive to said mechanical shock in a protected mode thereof, and which host device includes a housing switch that actuates in a way that is anticipatory with respect to said mechanical shock, an apparatus comprising:
an arrangement for detecting an actuation of said housing switch and, thereafter, causing said particular component to enter the protected mode from said operating mode as anticipatory to said mechanical shock.

46. The apparatus of claim 45 wherein said particular component is a hard disk drive and said protected mode includes positioning an actuator arrangement of the hard disk drive in a parked position.

47. In a host device that includes a housing that is operable by a user in a way which produces a mechanical shock to which at least a particular component of the host device is sensitive in an operating mode and which is less sensitive to said mechanical shock in a protected mode thereof, and which host device includes a housing switch that actuates in a way that is anticipatory with respect to said mechanical shock, a method comprising:
detecting an actuation of said housing switch and, thereafter, causing said particular component to enter the protected mode from said operating mode as anticipatory to said mechanical shock.

48. The method of claim 47 wherein said particular component is a hard disk drive and said protected mode includes positioning an actuator arrangement of the hard disk drive in a parked position.

49. A system, comprising:
a hard drive including
a read/write disk for storing digital data,
a spindle motor supporting said read/write disk for controlled rotation thereof,
a head arrangement configured for movement to selectively access the read/write disk in a data access mode and for movement to a parked position,
a sensor interface dedicated for receiving a plurality of sensor signals,
a processing arrangement for executing said data access mode by cooperatively controlling said spindle motor and said head arrangement, and for monitoring said sensor signals for detection of a signal value that is indicative of a potentially adverse operational environment for said hard drive and, responsive to detection of said signal value, for at least moving the head arrangement to a parked position; and
a sensor array forming part of said system, but not part of the hard drive, said sensor array including at least two sensors for providing said sensor signals to the sensor interface.

50. The system of claim 49 wherein said sensor array includes a combination of at least two sensors selected from the group of a pressure sensor, a temperature sensor, a free-fall sensor and a magnetic field sensor.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A device comprising:
   a storage medium configured to store data;
   a motor supporting said storage medium and configured to control movement thereof;
   a head arrangement configured for movement to selectively access the storage medium in a data access mode and for movement to a non-data access position wherein the head is not positioned to access the storage medium;
   a first dedicated input that is dedicated for receiving a first sensor related input signal; and
   a processing arrangement programmed to (i) execute said data access mode by cooperatively controlling said motor and said head arrangement, (ii) monitor said first sensor related input signal for occurrence of a predetermined value of a first minimum time duration, and (iii) responsive to detection of said predetermined value, at least move the head arrangement to said non-data access position, said processing arrangement being further configured for maintaining said head arrangement in the non-data access position so long as the first sensor related input signal remains at the predetermined value, subsequent to initially moving the head arrangement to the non-data access position;
   wherein the first sensor related input signal is a digital signal and the selected value of the first sensor related input signal is a first one of two states, and said processing arrangement is further configured for detecting an initial occurrence of a second one of the two states while maintaining said head arrangement in the non-data access position and, responsive to detecting the second state, monitoring said first sensor related input signal for any return to said first state, during a second minimum time duration that is measured from said initial occurrence of the second digital state, while continuing to maintain the head arrangement in said non-data access position over the second minimum time duration.

2. The device of claim 1 wherein said processing arrangement is implemented as a single processing device.

3. The device of claim 1 including an electrical interface that is made up of a plurality of electrical connections including a common ground connection and wherein no more than one of said electrical connections carries said first sensor related input signal relative to said common ground connection.

4. The device of claim 3 wherein said processing arrangement is configured for activating the first dedicated input, responsive to a vendor unique command that is issuable through said electrical interface, other than said first dedicated input.

5. The device of claim 1 wherein said processing arrangement is configured for user selectable activation of said first dedicated input when the device arrangement is installed in a host.

6. The device of claim 1 including an overall set of instructions that is executed by said processing arrangement to serve in operating the device, including a subset of said overall set of instructions for monitoring said first dedicated input and responding to the predetermined characteristic of the first sensor related input signal.

7. The device of claim 1 wherein the second minimum time duration is user selectable.

8. The device of claim 1 wherein the second minimum time duration is in a range from 100 milliseconds to 2500 milliseconds.

9. The device of claim 8 wherein the second minimum time duration is approximately 1000 milliseconds.

10. The device of claim 1 further comprising at least a second dedicated input for receiving a second sensor related input signal and said processing arrangement is further configured for monitoring a second predetermined characteristic of the second sensor related input signal and responsive thereto, at least moving the head arrangement to the parked position.

11. The device of claim 10 wherein said second sensor related signal is responsive to detection of pressure within a host device.

12. The device of claim 10 further comprising at least one additional input for receiving an additional sensor related input signal and said processing arrangement is further configured for monitoring an additional predetermined characteristic of the additional sensor related input signal and, responsive thereto, at least moving the head arrangement to the parked position.

13. The device of claim 12 wherein said processing arrangement is configured for using said second sensor related signal responsive to a pressure measurement within a host and said additional sensor related signal responsive to a temperature measurement within the host.

14. The device of claim 1, wherein the device is a hard disk drive having a storage medium comprising a read/write disk.

15. The device of claim 1, wherein the predetermined value corresponds to potential falling of the device.

16. The device of claim 1, wherein the non-data access position is a parked position.

17. The device of claim 1, wherein the two states are two digital states that are opposite to one another.

18. A device comprising:
    a storage medium configured to store data;
    a motor supporting said storage medium for controlled movement thereof;
    a head arrangement configured for movement to selectively access the storage medium in a data access mode and for movement to a non-data access position;
    a first dedicated input that is dedicated for receiving a first sensor related input signal; and
    a processing arrangement programmed to (i) execute said data access mode by cooperatively controlling said motor and said head arrangement, (ii) monitor said first sensor related input signal for occurrence of a predetermined value of a first minimum time duration, and (iii) responsive to detection of said predetermined value, at least move the head arrangement to said non-data access position, said processing arrangement being further configured for maintaining said head arrangement in the non-data access position so long as the first sensor related input signal remains at the predetermined value, subsequent to initially moving the head arrangement to the non-data access position;
    wherein said sensor related input signal is produced by a sensor that is located in a host device in electrical communication with said input, and wherein said processing arrangement is further configured for monitoring said sensor related input signal in a way which identifies an at least potential failure of said sensor.

19. The device of claim 18 wherein said processing arrangement identifies said failure, responsive to detection of said predetermined value for a second minimum time duration greater than the first time duration.

20. The device of claim 19 wherein said predetermined value is indicative of a potential failing status of the device in conjunction with a second minimum time duration and wherein said second minimum time duration is at least 1 second.

21. The device of claim 18, wherein the device comprises a hard disk drive and wherein the storage medium comprises a read/write disk.

22. The device of claim 18, wherein the predetermined value corresponds to potential falling of the device.

23. The device of claim 18, wherein the non-data access position is a parked position.

24. A device for operation in an environment that may subject the device to a given mechanical shock, said device comprising:
 a storage medium configured to store data;
 a motor supporting said storage medium for controlled rotation thereof;
 a head arrangement configured for movement to access the storage medium in a data access mode and for movement to a non-data access position as part of a protected mode such that the device is not susceptible to said given mechanical shock in the protected mode and is susceptible to the given mechanical shock in the data access mode;
 a dedicated input that is dedicated for receiving a sensor related input signal; and
 a processor for (i) executing said data access mode, by cooperatively controlling said motor and said head arrangement, (ii) monitoring the sensor related input signal for a predetermined characteristic thereof, and (iii) responsive to detection of said predetermined characteristic of the sensor related input signal, causing the device to enter said protected mode at least by moving said head arrangement to the non-data access position until said predetermined characteristic of the sensor is no longer detected for at least a first minimum period;
 wherein the first minimum period is greater than 100 milliseconds and less than 2500 milliseconds.

25. The device of claim 24, wherein the device comprises a hard disk drive and wherein the storage medium comprises a read/write disk.

26. A method for producing a device for operation in an environment that may subject the device to a given mechanical shock, said method comprising:
 providing a storage medium configured to store data;
 supporting the storage medium using a motor for controlled rotation thereof;
 providing a head arrangement for movement to access the storage medium in a data access mode and for movement to a non-data access position as part of a protected mode such that the device is not susceptible to said given mechanical shock in the protected mode and is susceptible to the given mechanical shock in the data access mode;
 configuring a dedicated input for receiving a sensor related input signal; and
 using a processor for (i) executing said data access mode, by cooperatively controlling said spindle motor and said head arrangement, (ii) monitoring the sensor related input signal for predetermined characteristic thereof, (iii) responsive to detection of said predetermined characteristic of the sensor related input signal for a first minimum time duration, causing the device to enter said protected mode at least by moving said head arrangement to the non-data access position and (iv) responsive to failure to detect said predetermined characteristic of the sensor related input signal for a second minimum time duration following detection of said predetermined characteristic of the sensor related input signal for the first minimum time duration, causing the device to leave said protected mode at least by moving said head arrangement out of the non-data access position;
 wherein the second minimum time duration is greater than 100 milliseconds and less than 2500 milliseconds.

27. The method of claim 26, wherein the device comprises a hard disk drive and wherein the storage medium comprises a read/write disk.

28. The method of claim 26, wherein the non-data access position is a parked position.

29. In a host device that includes a housing that is operable by a user in a way which produces a mechanical shock to which a storage device of the host device is sensitive in an operating mode and which is less sensitive to said mechanical shock in a protected mode thereof in which a head thereof is in a non-data access position, and which host device includes a housing switch that actuates in response to movement of a first housing portion relative to a second housing portion from an open position toward a closed position, an apparatus comprising:
 an arrangement for detecting an actuation of said housing switch and, thereafter, causing said storage device to enter the protected mode from said operating mode as anticipatory to said mechanical shock, and said housing switch being positioned such that actuation of the switch is anticipatory of potential impacts occurring between first and second housing portions of the host device housing.

30. In a host device that includes a housing that is operable by a user in a way which produces a mechanical shock to which at least a storage device of the host device is sensitive in an operating mode and which is less sensitive to said mechanical shock in a protected mode thereof in which a head thereof is in a non-data access position, and which host device includes a housing switch that actuates in a way that is anticipatory with respect to said mechanical shock, a method comprising:
 detecting an actuation of said housing switch resulting from movement of a first housing portion relative to a second housing portion from an open position toward a closed position and, thereafter, causing said storage device to enter the protected mode from said operating mode as anticipatory to said mechanical shock possibly resulting from an impact between the first and second housing portions upon arriving at the closed position.

31. A system, comprising: a device including:
 a storage medium configured to store data;
 a motor supporting said storage medium for controlled rotation thereof;
 a head arrangement configured for movement to selectively access the storage medium in a data access mode and for movement to a non-data access position; and
 a sensor interface dedicated for receiving a plurality of sensor signals;
a sensor array forming part of said system, but not part of the device, including at least two sensors for providing said sensor signals to the sensor interface; and means for executing said data access mode by cooperatively controlling said spindle motor and said head arrangement, and for monitoring said sensor signals for detection of a signal value that is indicative of a potentially adverse operational environment for said device and, responsive to detection of said signal value, for at least moving the head arrangement to a non-data access position, said means cooperating with said sensor array and sensor interface to monitor for a signal value that is indicative of a quiescent mechanical shock environment after an initial impact to the device;

wherein the means is configured to further perform the following processes if there is no signal value that is indicative of a potentially adverse operational environment for said device:
  compare a first measured parameter to a threshold for the first measured parameter and entering a protection sequence if the threshold for the first measured parameter is less than the measured parameter; and
  compare a second measured parameter to a threshold for the second measured parameter if the threshold for the first measured parameter exceeds the first measured parameter and entering a protection sequence if the second measured parameter exceeds the threshold for the second measured parameter.

32. The system of claim 31, wherein the device comprises a hard disk drive and wherein the storage medium comprises a read/write disk.

33. The system of claim 31, wherein the non-data access position is a parked position.

34. An electonic device comprising:
  a first housing portion;
  a second housing protion pivotally coupled to the first housing protionsuch that the first and second housing portions are operable by a user i a way which produces a mechanical shock;
  a hard drive mounted within one of the first and second housing portions, the hard drive comprising at least one disk and a read/write head having an operating position and a protected position, the read/write head being parked in the protected position and the hard drive being sensitive to the mechanical shock in the operating position and les sensitive to the mechanical shock in the protected position;
  a switch mounted to the first housing portion that actuates in response to movement of a first housing portion relative to a second housing portion from an open position toward a closed position; and
  a processor mounted within one of the first and second housing portions and coupled to the switch and hard drive, the procesor programmed to detect actuation of the switch and , thereafter, instruct the hard drive to enter the protected position from said operating position as anticipatory to the mechanical shock, the switch being positioned such that actuation of the switch is anticipatory of potential impacts occurring between first and second housing portions.

35. The device of claim 34, further comprising a microphone mounted to one of the first housing portion and second housing portion and a speaker mounted to the other of the first housing portion and the second housing portion.

36. The device of claim 35, further comprising a keypad mounted to one of the first and second housing portions.

37. An electronic device comprising:
  a first means for housing;
  a second means for housing pivotally coupled to the first housing portion such that the first and second means for housing are operable by a user in a way which produces a mechanical shock;
  a storage device mounted within one of the first and second means for housing, the hard drive comprising at least one storage medium and a read/write head having an operating position and a protected position, the read/write head being in a non-data access position in the protected position and the hard drive being sensitive to the mechanical shock in the operating position and less sensitive to the mechanical shock in the protected position;
  a means for sensing movement of the second housing means relative to the first housing means from an open position toward a closed position; and
  a means for detecting actuation of the means for sensing and, thereafter, instructing the hard drive to enter the protected position from said operating position as anticipatory to the mechanical shock, the means for sensing being positioned such that actuation of the means for sensing is anticipatory of potential impacts occurring between first and second means for housing.

38. The device of claim 37, further comprisig a microphone mounted to one of the first and second means for housing and a speaker mounted to the other of the first and second means for housing.

39. The device of claim 38, further comprising a keypad mounted to one of the first and second means for housing.

* * * * *

UNITED STATES PATENT AND TRADEMARK OFFICE
CERTIFICATE OF CORRECTION

PATENT NO. : 7,733,595 B2
APPLICATION NO. : 11/327569
DATED : June 8, 2010
INVENTOR(S) : Lucas et al.

It is certified that error appears in the above-identified patent and that said Letters Patent is hereby corrected as shown below:

<u>Title Page</u>
Item (56), under "OTHER PUBLICATIONS", in Line 2, delete "Protection;," and insert --Protection;--
Item (56), under "OTHER PUBLICATIONS", in Line 2, delete "2003;IBM" and insert --2003; IBM--
Item (56), under "OTHER PUBLICATIONS", in Line 3, delete "al" and insert --al.--

<u>Column 21</u>
Line 44, delete "second digital state," and insert --second state,--

<u>Column 22</u>
Line 20, delete "host device." and insert --host.--

<u>Column 25</u>
Line 29, delete "electonic" and insert --electronic--
Line 31, delete "protion" and insert --portion--
Line 32, delete "protionsuch" and insert --portion such--
Line 33, delete "user i" and insert --user in--
Line 41, delete "les" and insert --less--

<u>Column 26</u>
Line 3, delete "procesor" and insert --processor--
Line 4, delete "and ," and insert --and,--
Line 11, delete "second" and insert --the second--
Line 40, delete "comprisig" and insert --comprising--

Signed and Sealed this

Fourteenth Day of September, 2010

David J. Kappos
*Director of the United States Patent and Trademark Office*